(12) United States Patent
Ryu

(10) Patent No.: US 8,203,795 B2
(45) Date of Patent: Jun. 19, 2012

(54) MACRO-LENS SYSTEM AND PHOTOGRAPHING APPARATUS HAVING THE SAME

(75) Inventor: Jae-myung Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 13/089,429

(22) Filed: Apr. 19, 2011

(65) Prior Publication Data

US 2012/0081798 A1    Apr. 5, 2012

(30) Foreign Application Priority Data

Oct. 1, 2010    (KR) .................... 10-2010-0095964

(51) Int. Cl.
*G02B 15/22* (2006.01)

(52) U.S. Cl. ........ 359/693; 359/557; 359/683; 359/684; 359/685; 359/740; 359/763; 359/770

(58) Field of Classification Search .................. 359/557, 359/683–685, 693, 740, 763, 770
See application file for complete search history.

(56) References Cited

U.S. PATENT DOCUMENTS

| | | | |
|---|---|---|---|
| 5,909,319 A * | 6/1999 | Matsui | 359/693 |
| 7,864,451 B2 * | 1/2011 | Taki | 359/557 |

* cited by examiner

*Primary Examiner* — Evelyn A. Lester
(74) *Attorney, Agent, or Firm* — Drinker Biddle & Reath LLP

(57) ABSTRACT

A macro-lens system and a photographing apparatus having the macro-lens system. The macro-lens system includes: first, second, third, fourth, and fifth lens groups which are arranged in order from an object side to an image side, wherein the first lens group has a positive refractive power and is fixed during focusing, the second lens group has a negative refractive power and is moved during focusing, the third lens group has a positive refractive power and is fixed during focusing, the fourth lens group has a positive refractive power and is moved during focusing, and the fifth lens group has a negative refractive power.

22 Claims, 30 Drawing Sheets

(M=0.0)

(M=−0.5)

(M=−1.0)

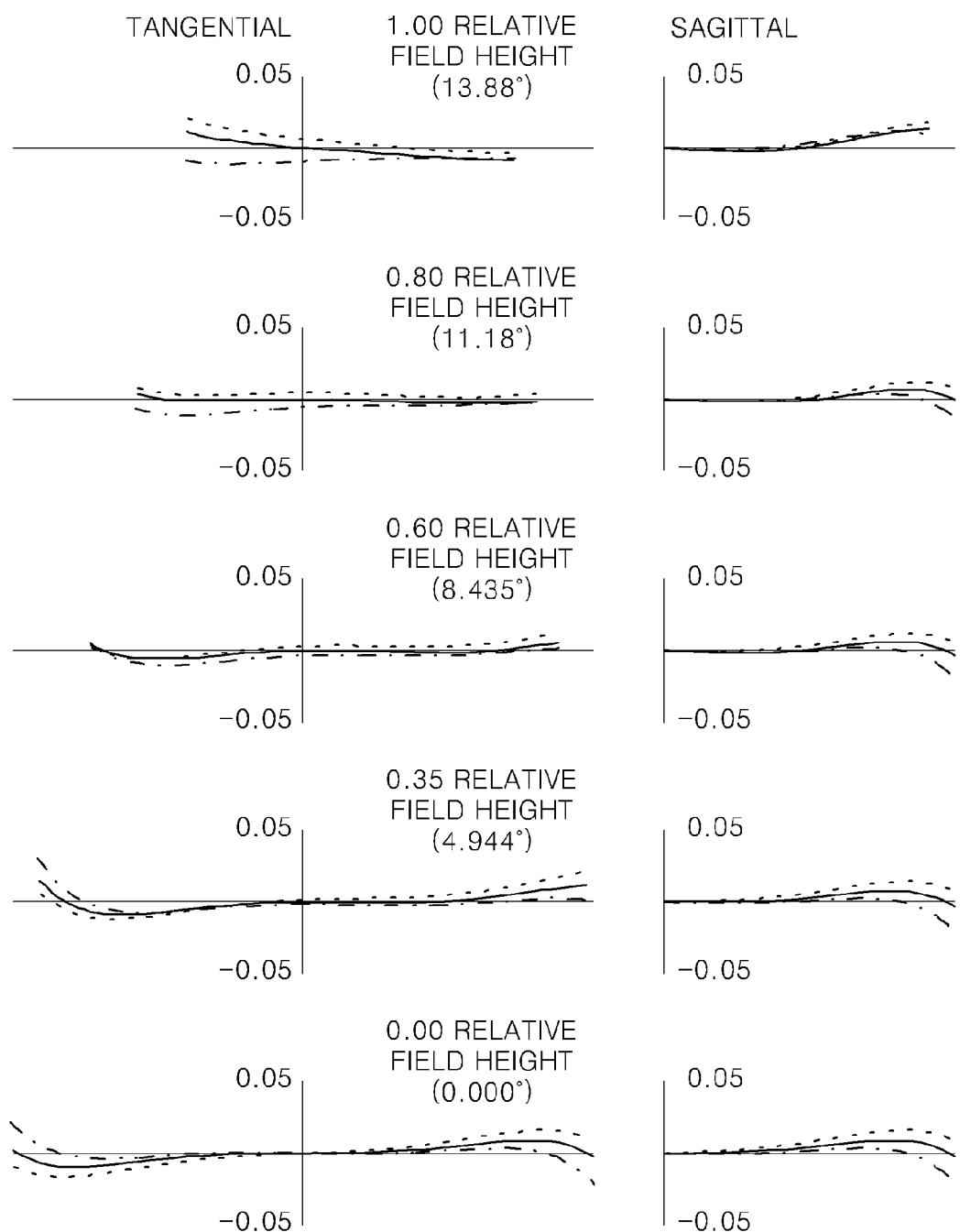

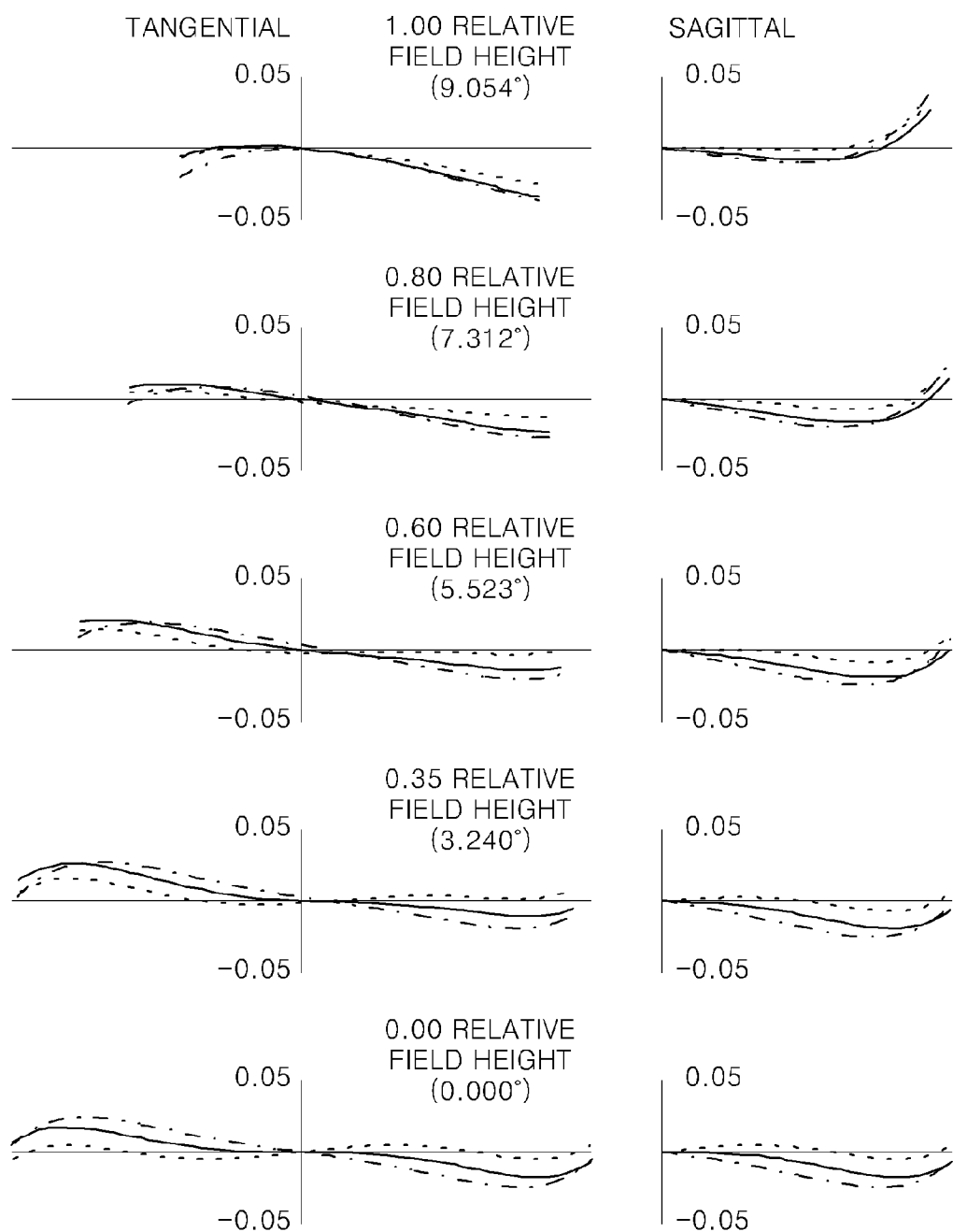

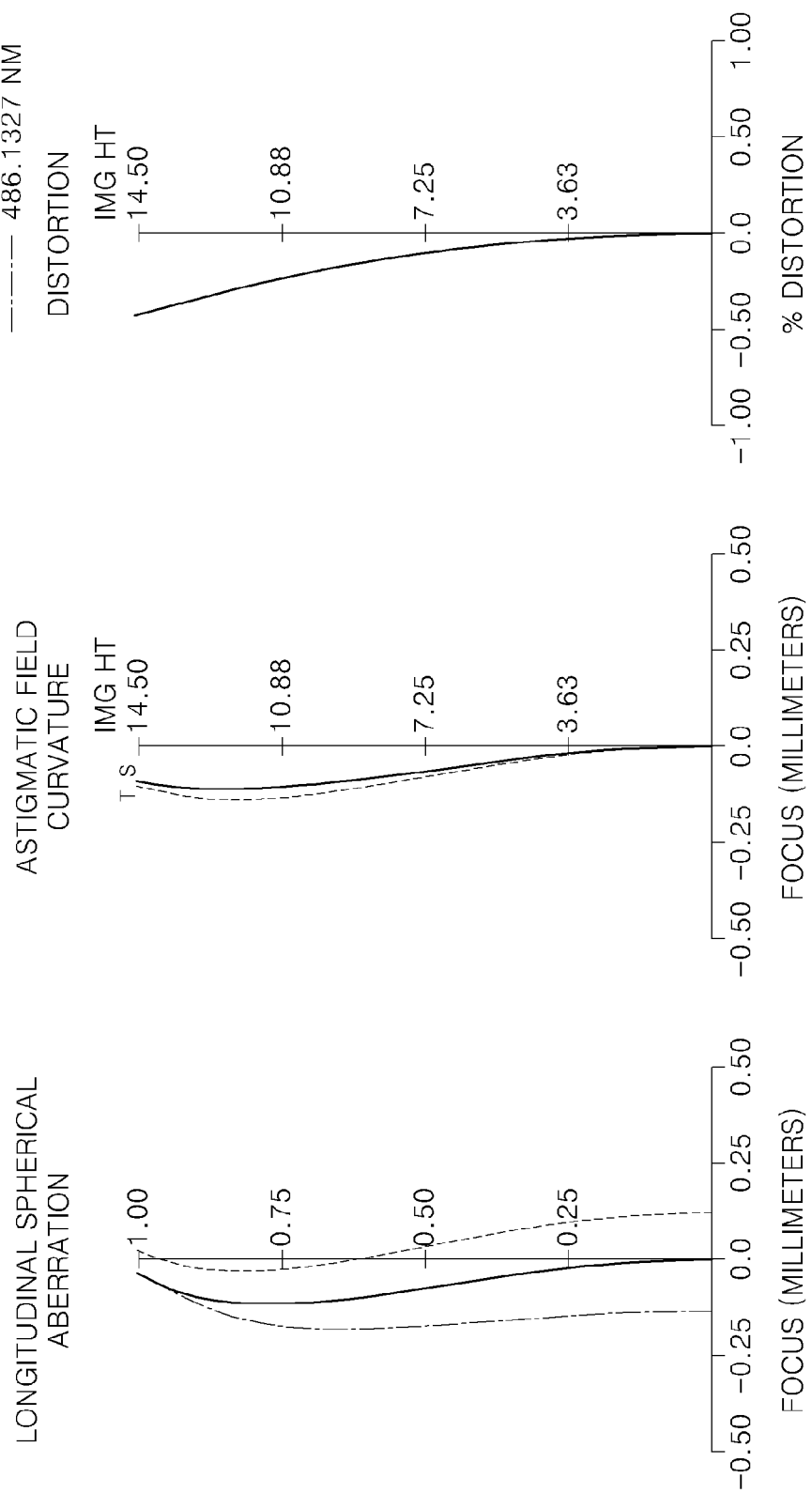

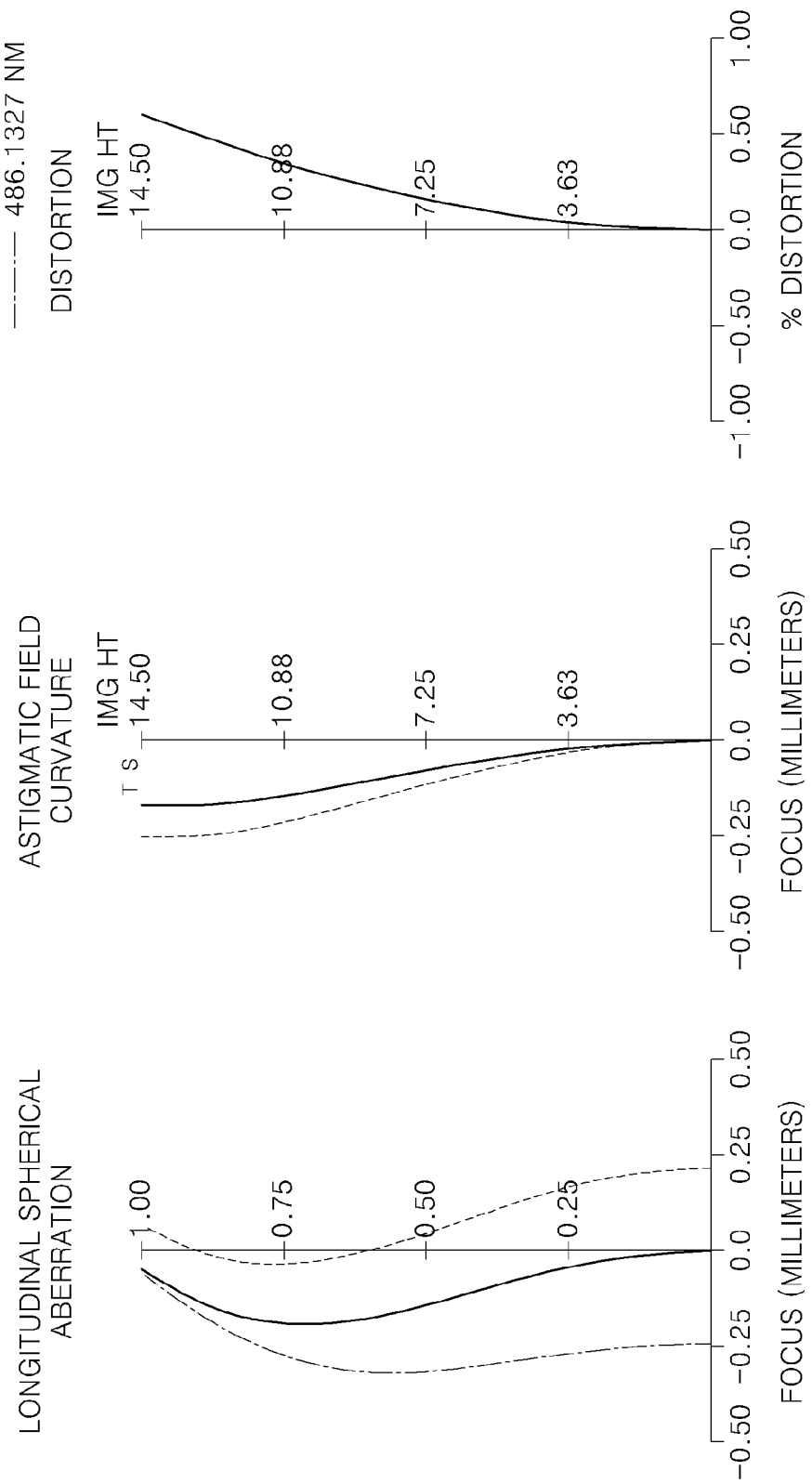

(M=0.0)

(M=−0.5)

(M=−1.0)

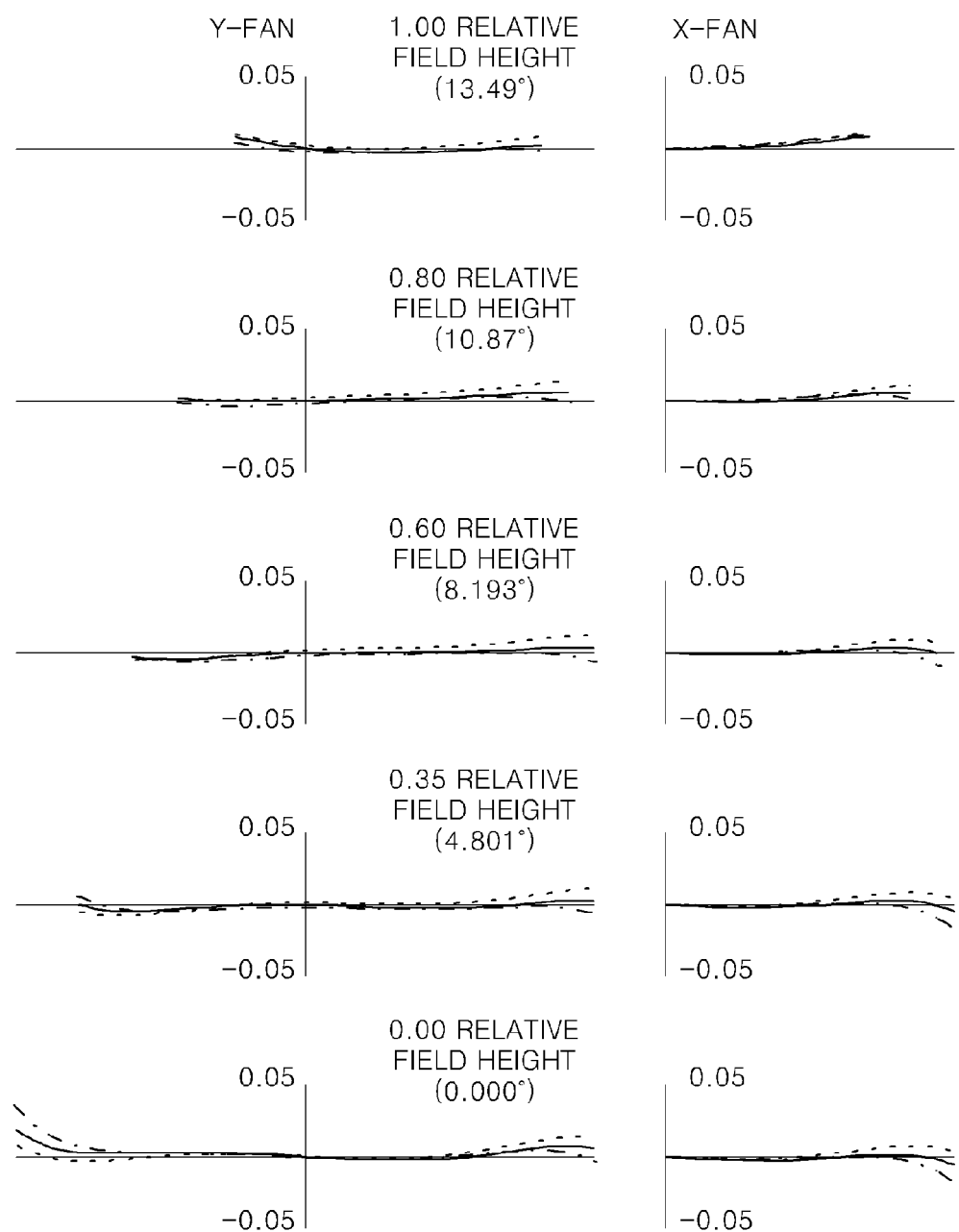

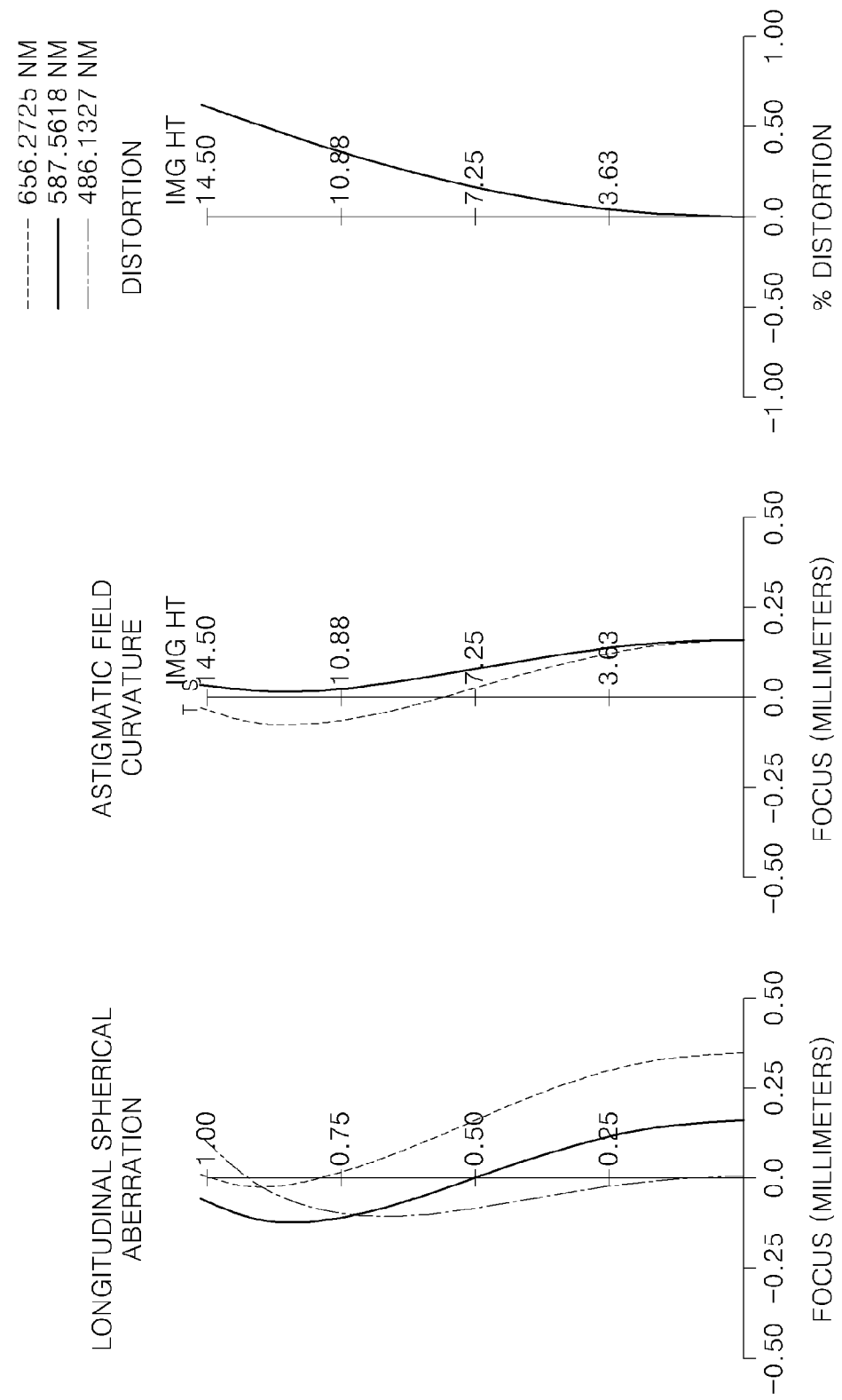

(M=0.0)

(M=−0.5)

(M=−1.0)

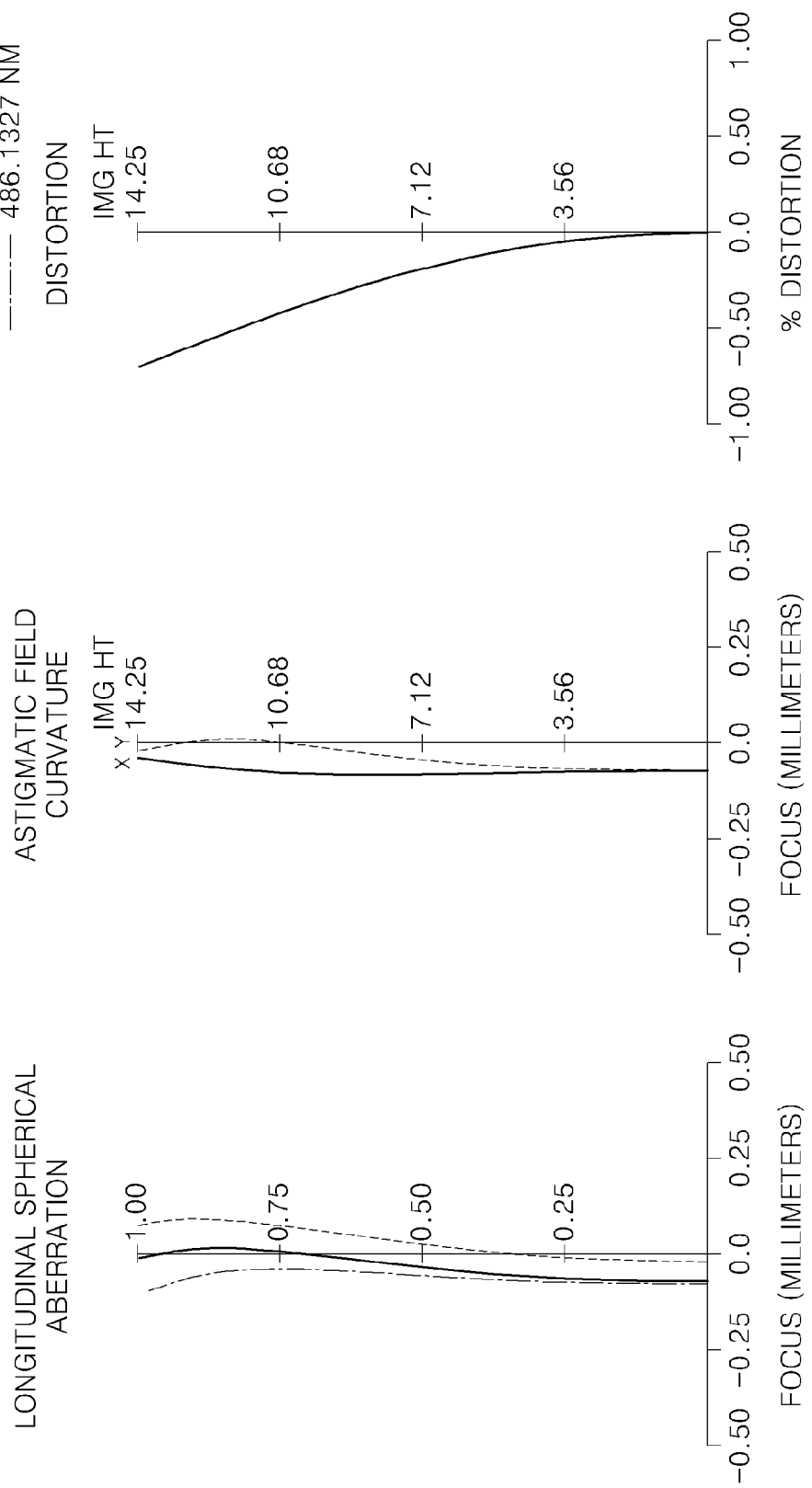

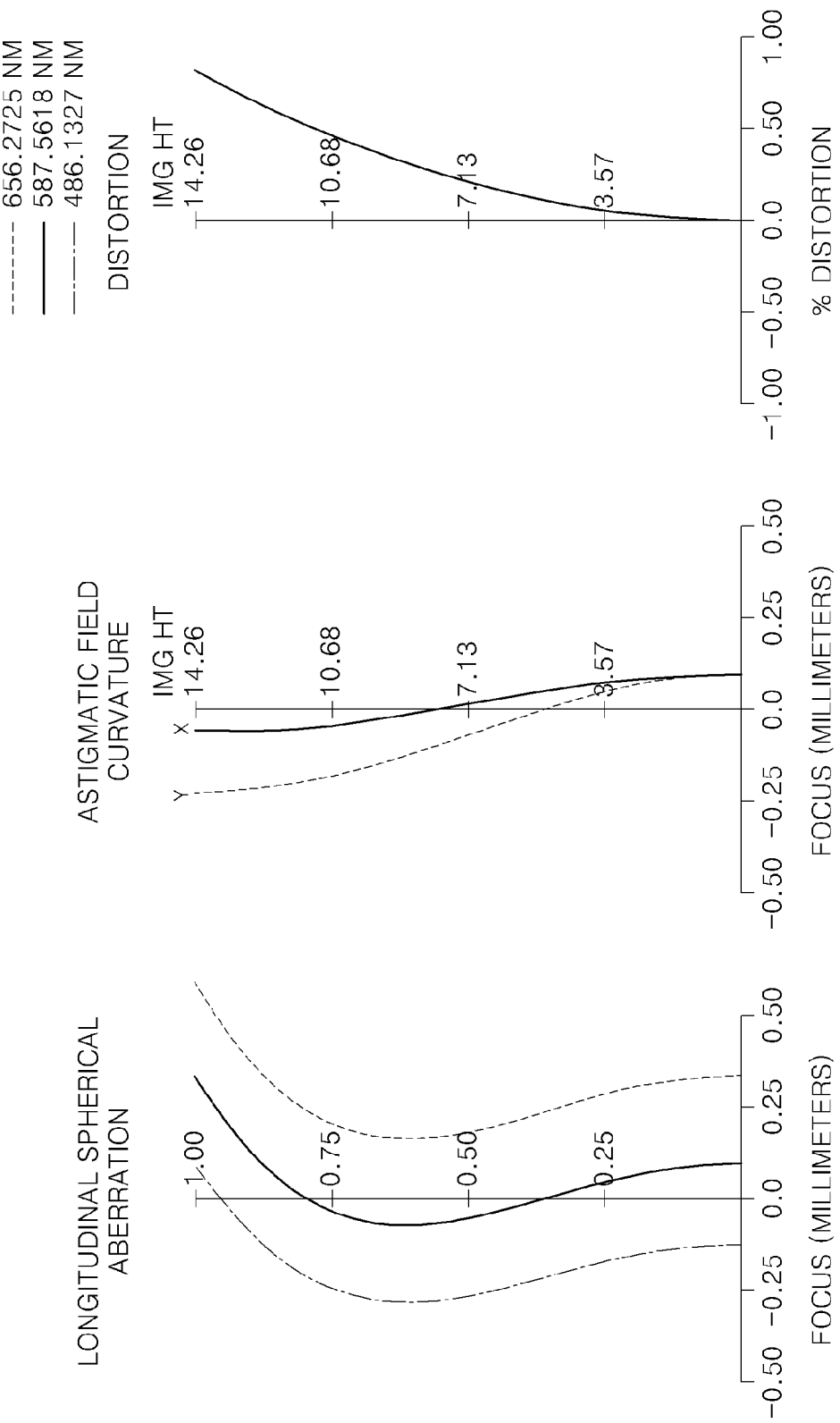

(M=0.0)

(M=−0.5)

(M=−1.0)

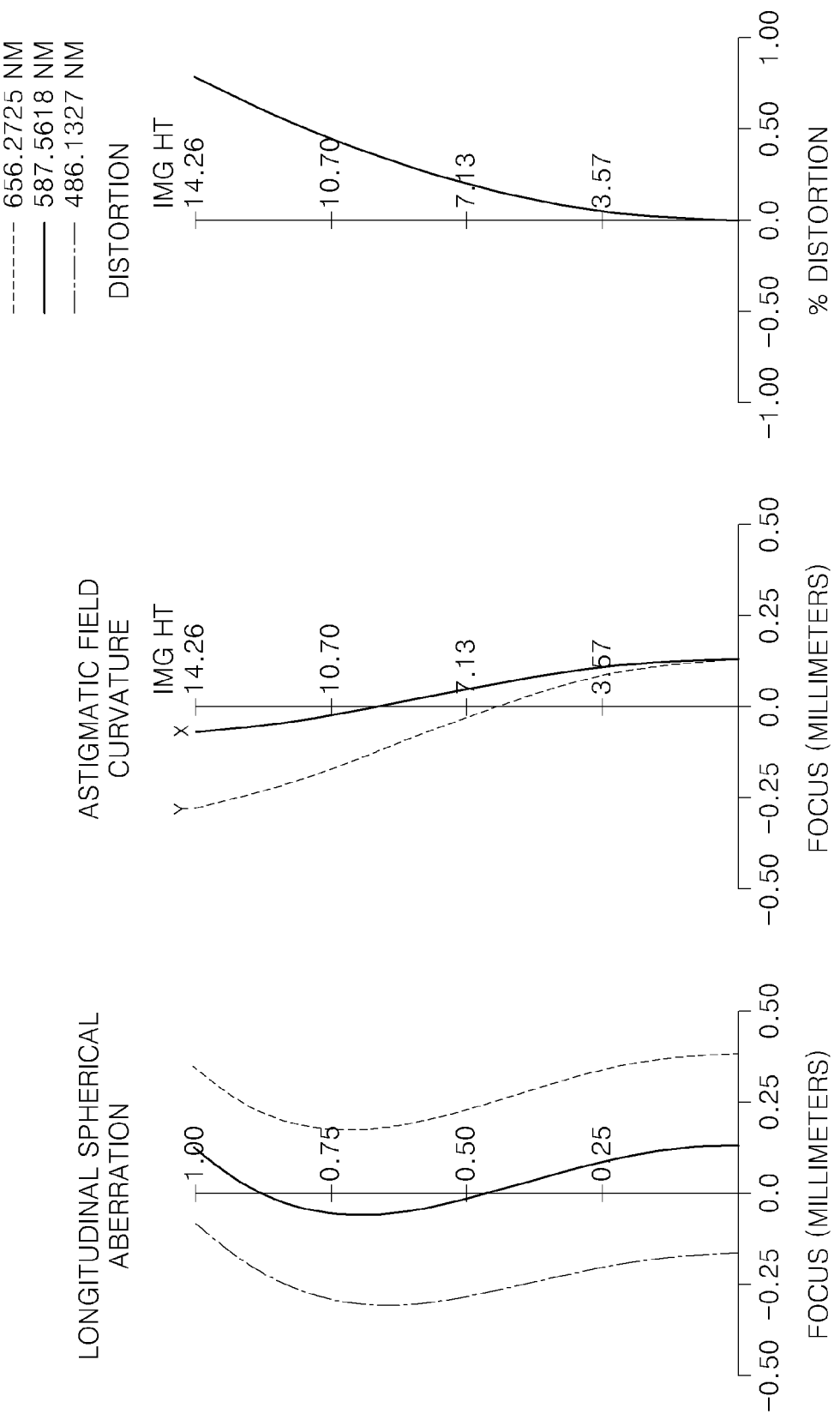

MACRO-LENS SYSTEM AND PHOTOGRAPHING APPARATUS HAVING THE SAME

CROSS-REFERENCE TO RELATED PATENT APPLICATION

This application claims the benefit of Korean patent application No. 10-2010-0095964, filed on Oct. 1, 2010, in the Korean Intellectual Property Office, the entire disclosure of which is incorporated herein by reference.

BACKGROUND

1. Field of the Invention

The invention relates to a macro-lens system capable of taking close-up pictures and a photographing apparatus having the same.

2. Description of the Related Art

Demand for single lens reflex cameras has increased. And in particular, demand for digital single lens reflex cameras using image sensors, such as a charge-coupled device (CCD), a complementary metal-oxide semiconductor (CMOS), or the like, has increased. Some consumers demand high quality digital single lens reflex cameras and demand that the cameras be compact. In order to meet the demands of the consumers, the lens system must be of a high quality capable of capturing good images of subjects and capable of performing close-up photographing, and yet remain compact.

SUMMARY

Therefore, there is a need in the art for a macro-lens system including: a first lens group which has a positive refractive power and is fixed during focusing; a second lens group which has a negative refractive power and is moved during focusing; a third lens group which has a positive refractive power and is fixed during focusing; a fourth lens group which has a positive refractive power and is moved during focusing; and a fifth lens group which has a negative refractive power, wherein the first, second, third, fourth, and fifth lens groups are arranged in order from an object side to an image side, and the macro-lens system satisfies the expression:

$$0.5 \leq \frac{f_3}{f} \leq 0.9$$

wherein $f_3$ denotes a focal length of the third lens group, and f denotes a total focal length of the macro-lens system.

Some lenses of the second lens group may be moved in a vertical direction to an optical axis to perform an anti-handshake.

According to another aspect of the invention, there is provided a macro-lens system including: a first lens group which has a positive refractive power and is fixed during focusing; a second lens group which has a negative refractive power and is moved during focusing; a third lens group which has a positive refractive power and is fixed during focusing; a fourth lens group which has a positive refractive power and is moved during focusing; and a fifth lens group which has a negative refractive power, wherein the first, second, third, fourth, and fifth lens groups are arranged in order from an object side to an image side, and the third lens group includes an anti-hand shaking group which is moved in a vertical direction to an optical axis to compensate for image blur.

Some lenses of the third lens group may perform an anti-handshake.

The macro-lens system may satisfy the expression:

$$0.5 \leq \frac{f_3}{f} \leq 1.6$$

wherein $f_3$ denotes a focal length of the third lens group, and f denotes a total focal length of the macro-lens system.

The macro-lens system may satisfy the expression:

$$60 \leq v_d$$

wherein $v_d$ denotes an Abbe number of a lens of the third lens group used as an anti-hand shaking group.

The second lens group may be moved from the object side to the image side during focusing.

The fourth lens group may be moved from the image side to the object side during focusing.

The fifth lens group may be fixed during focusing.

The fifth lens group may include a lens.

The first lens group may include at least one doublet lens.

The third lens group may include a stop.

The second lens group may include a meniscus lens, a biconcave lens, or a plano-concave lens.

A maximum magnification of the macro-lens system may be within a range between about −0.5 and about −1.

According to another aspect of the invention, there is provided a photographing apparatus including: a macro-lens system; and an image device which receives an image formed by the macro-lens system, wherein the macro-lens system includes first, second, third, fourth, and fifth lens groups which are arranged in order from an object side to an image side, wherein the first lens group has a positive refractive power and is fixed during focusing, the second lens group has a negative refractive power and is moved during focusing, the third lens group has a positive refractive power and is fixed during focusing, the fourth lens group has a positive refractive power and is moved during focusing, the fifth lens group has a negative refractive power, and the macro-lens system satisfies the expression:

$$0.5 \leq \frac{f_3}{f} \leq 0.9$$

wherein $f_3$ denotes a focal length of the third lens group, and f denotes a total focal length of the macro-lens system.

According to another aspect of the invention, there is provided a photographing apparatus including: a macro-lens system; and an image device which receives an image formed by the macro-lens system, wherein the macro-lens system includes first, second, third, fourth, and fifth lens groups which are arranged in order from an object side to an image side, wherein the first lens group has a positive refractive power and is fixed during focusing, the second lens group has a negative refractive power and is moved during focusing, the third lens group has a positive refractive power and is fixed during focusing, the fourth lens group has a positive refractive power and is moved during focusing, and the fifth lens group has a negative refractive power, wherein the third lens group includes an anti-hand shaking group which is moved in a vertical direction to an optical axis to compensate for image blur.

BRIEF DESCRIPTION OF THE DRAWINGS

The above and other features and advantages of the invention will become more apparent by describing in detail exemplary embodiments thereof with reference to the attached drawings in which:

FIG. 2A illustrates a ray fan of the macro-lens system of FIG. 1 when the magnification is M=0.0;

FIG. 2B illustrates the ray fan of the macro-lens system of FIG. 1 when the magnification is M=−0.5;

FIG. 3B illustrates a longitudinal spherical aberration, an astigmatic field curvature, and a distortion of the macro-lens system of FIG. 1 when the magnification is M=−0.5;

FIG. 3C illustrates a longitudinal spherical aberration, an astigmatic field curvature, and a distortion of the macro-lens system of FIG. 1 when the magnification is M=−1.0;

FIGS. 8A through 8C respectively illustrate the ray fans of the macro-lens system of FIG. 6 when the magnification is M=0.0 and an image blur is compensated for;

FIG. 9C illustrates a longitudinal spherical aberration, an astigmatic field curvature, and a distortion of the macro-lens system of FIG. 6 when the magnification is M=−1.0;

FIG. 11A illustrates a longitudinal spherical aberration, an astigmatic field curvature, and a distortion of the macro-lens system of FIG. 10 when the magnification is M=0.0;

FIG. 11C illustrates a longitudinal spherical aberration, an astigmatic field curvature, and a distortion of the macro-lens system of FIG. 10 when the magnification is M=−1.0;

FIG. 13C illustrates a longitudinal spherical aberration, an astigmatic field curvature, and a distortion of the macro-lens system of FIG. 12 when the magnification is M=−1.0.

DETAILED DESCRIPTION

Figure 1:
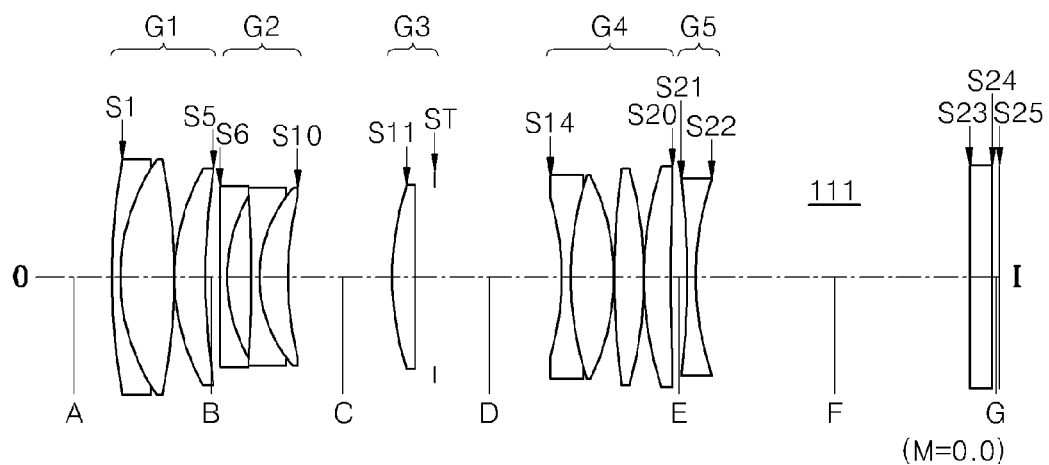
FIG. 1 illustrates a macro-lens system when a magnification is M=0.0, M=−0.5, and M=−1.0, according to an embodiment of the invention.
Figure 1:
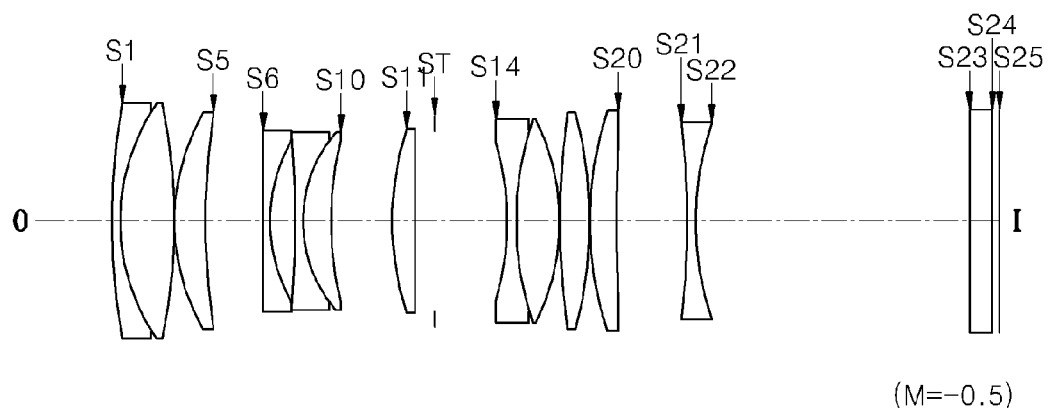
Figure 1:
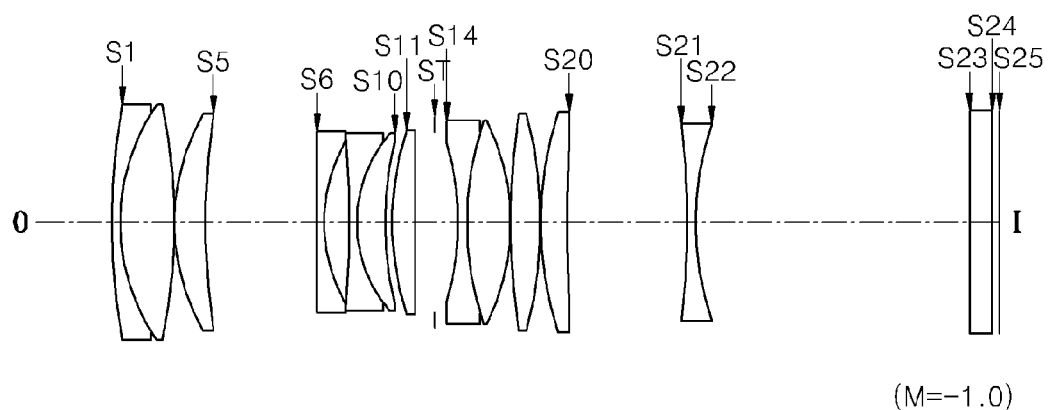

A macro-lens system and a photographing apparatus having the macro-lens system according to embodiments of the invention will now be described in detail with reference to the attached drawings. Like reference numerals in the drawings denote like elements, and the sizes or thicknesses of the elements are exaggerated for clarity. Hereinafter, the embodiments will be exemplarily described, but various changes in form and details may be made from the embodiments without departing from the spirit and scope of the invention as defined by the following claims.

A lens system according to embodiments of the invention is a macro-lens system which may be used in a camera or a video camera and may be constituted not to change an overall length during focusing for portability convenience.

FIG. 1 illustrates a macro-lens system 111 when a magnification is M=0.0, M=−0.5, and M=−1.0, according to an embodiment of the invention.

Referring to FIG. 1, a macro-lens system 111 according to the current embodiment of the invention includes first, second, third, fourth, and fifth lens groups G1, G2, G3, G4, and G5 which are arranged in order from an object side O to an image side I. Here, the first, third, and fourth lens groups G1, G3, and G4 have positive refractive powers, and the second and fifth lens groups G2 and G5 have negative refractive powers. In the macro-lens system 111, the first and third lens groups G1 and G3 are fixed, and the second and fourth lens groups G2 and G4 are moved so as not to change an overall length during focusing. The fifth lens group G5 is moved or fixed during focusing. The second lens group G2 is moved from the object side O to the image side I during focusing. The fourth lens group G4 is moved from the image side I to the object side O during focusing.

The first lens group G1 may include at least one negative lens and at least one positive lens. Alternatively the first lens group G1 may include a doublet lens having a negative lens and a positive lens. The second lens group G2 may include at least one negative lens and at least one positive lens. Alternatively, the second lens group G2 may include a doublet lens having a negative lens and a positive lens. The third lens group G3 includes a lens or a plurality of lenses. The third lens group G3 includes a stop ST. For example, the stop ST of the third lens group G3 is located on the object side O or the image side I. The fourth lens group G4 may include at least one negative lens and at least one positive lens. Alternatively, the fourth lens group G4 may include at least one doublet lens. The fifth lens group G5 includes at least one lens. For example, the fifth lens group G5 may include a single lens.

The second lens group G2 has strong negative refractive power and performs focusing. The third lens group G3 includes the stop ST and compensates for spherical aberration. The fourth lens group G4 compensates for a position change of an image plane, and the fifth lens group G5 compensates for an astigmatic field curvature and distortion. Here, a main performance of each lens group has been described but is not limited thereto.

If a lens group is not installed around the stop ST, it may be difficult to compensate for spherical aberration in the vicinity of an infinite object length. Since the second lens group G2 has a negative refractive power, a ray that has passed the second lens group G2 may generally diverge so that a size of the fourth lens group G4 located next to the stop ST needs to be increased, thereby increasing a weight of the fourth lens group G4. However, since the fourth lens group G4 is moved during focusing, the weight of the fourth lens group G4 may be light. Therefore, in the current embodiment, the third lens group G3 having a positive refractive power is installed next to the second lens group G2 to reduce a an aperture of the fourth lens group G4, thereby reducing the weight of the fourth lens group G4. In other words, an axial marginal ray becomes a parallel ray or diverges due to the strong negative refractive power of the second lens group G2 and then converges due to the positive refractive power of the third lens group G3. Therefore, the aperture of the fourth lens group G4 may be reduced. It is necessary to reduce the aperture of the fourth lens group G4 in order to reduce the weight of the fourth lens group G4. However, the aperture of the fourth lens group G4 may be increased to increase a marginal ray ratio. A focal length of the third lens group G3 may be shortened to reduce the aperture of the fourth lens group G4 and increase the marginal ray ratio.

The macro-lens system 111 according to the current embodiment may satisfy Expression 1 below:

$$0.5 \le \frac{f_3}{f} \le 0.9 \qquad \text{Expression (1)}$$

wherein $f_3$ denotes the focal length of the third lens group G3, and f denotes a total focal length of the macro-lens system 111. Therefore, the macro-lens system 111 may satisfy Expression 1 to reduce the aperture of the fourth lens group G4 and improve the marginal ray ratio.

The macro-lens system 111 may include an anti-hand shaking group. For example, the second lens group G2 or the third lens group G3 may be used as the anti-hand shaking group. The anti-hand shaking group is moved in a vertical direction to an optical axis to compensate for image blur. A focal length of the anti-hand shaking group may be shortened to reduce a movement of the anti-hand shaking group. If the movement of the anti-hand shaking group is small, the macro-lens system 111 may be made compact. For example, if a ray converges on the second lens group G2 due to the positive refractive power of the first lens group G1, and the second lens group G2 is used as the anti-hand shaking group due to a small aperture thereof, a weight of the macro-lens system 111 may be made light. Alternatively, not a moveable lens group but a fixed lens group may include the anti-hand shaking group so as to be advantageous to design and electronically control a device for moving the anti-hand shaking group. For example, the third lens group G3 may include the anti-hand shaking group. Some lenses of the second lens group G1 or some lenses of the third lens group G3 may be moved in a vertical direction to the optical axis to compensate for image blur. The invention is not limited thereto, and all lenses of the second or third lens group G2 or G3 may be moved to compensate for image blur.

The second lens group G2 may not include a biconvex lens. An aperture of the second lens group G2 must be increased to reduce the F number. However, if the aperture of the second lens group G2 is increased, a weight of the second lens group G2 is increased. If the weight of the second lens group G2 that moves during focusing is increased, a load of a driving motor may be increased. If the second lens group G2 includes the biconvex lens, the weight of the second lens group G2 may be increased with the increase in the aperture thereof than if including a meniscus lens. Therefore, the second lens group G2 may not use the biconvex lens. For example, the second lens group G2 may include at least one of a meniscus lens, a concave lens, or a plano-concave lens.

The macro-lens system 111 according to the current embodiment may be bright due to the small F number and perform macro-photographing by −10 magnification. The current embodiment provides a macro-lens system which may respectively distribute refractive powers to lens groups so as to have a small F number and a large aperture and be made light using a small number of lenses. The macro-lens system 111 according to the current embodiment may have a maximum image magnification within a range between about −0.5 and about −1. For example, the macro-lens system 111 according to the current embodiment may have an image magnification within a range between about 0 and about −1.

The fifth lens group G5 may not include several sub-lens groups but may include only a single lens group so as not to lengthen the optical overall length. The single lens group refers to a lens group which does not include sub-lens groups that are moved independent of one another. The fifth lens group G5 may include a lens. For example, the lens may be a biconcave lens.

Figure 6:
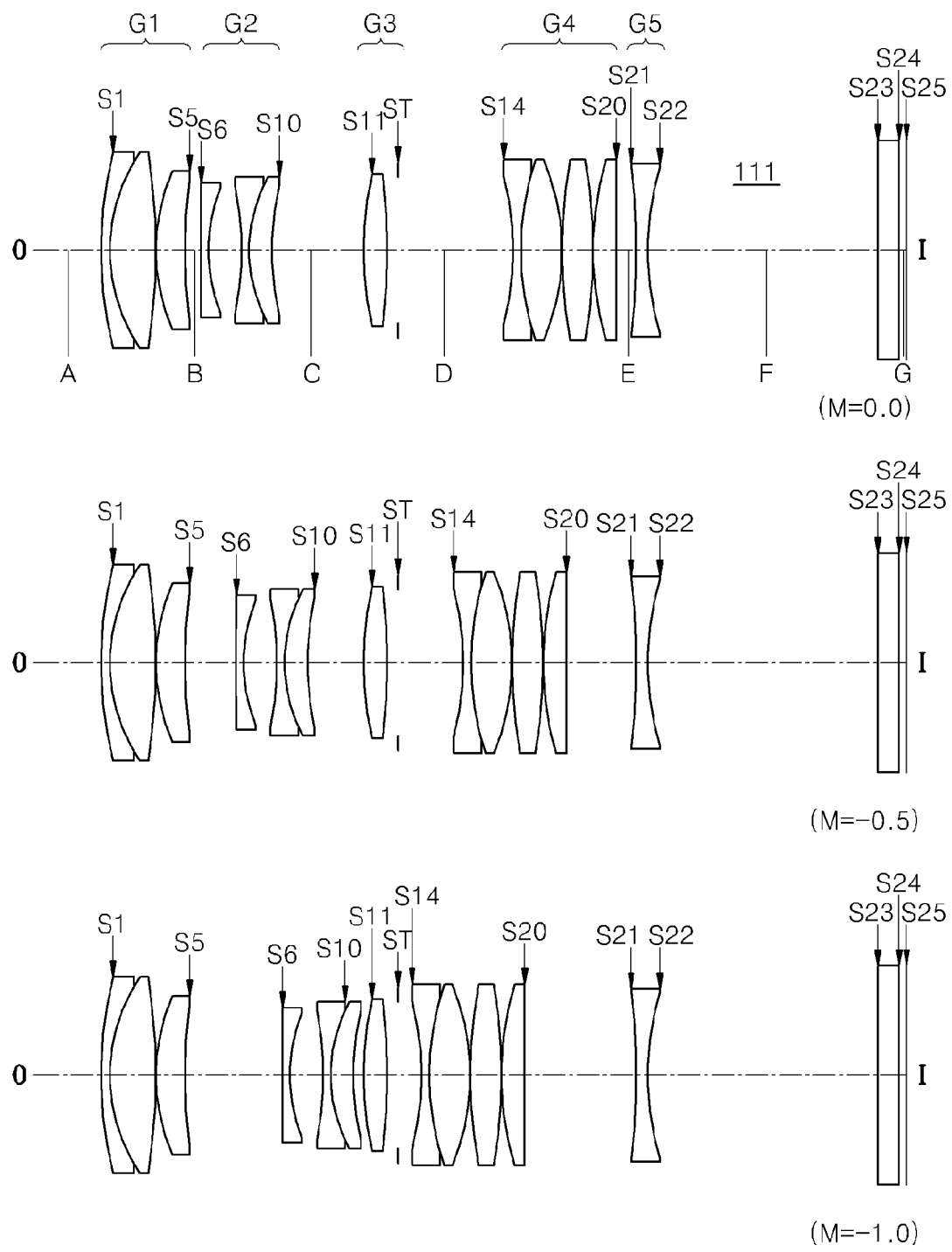
FIG. 6 illustrates a macro-lens system when a magnification is M=0, M=−0.5, and M=−1.0, according to another embodiment of the invention.

FIG. 6 illustrates a macro-lens system 111 when a magnification is M=0.0, M=−0.5, and M=−1.0, according to another embodiment of the invention.

Referring to FIG. 6, the macro-lens system 111 according to the current embodiment of the invention includes first, second, third, fourth, and fifth lens groups G1, G2, G3, G4, and G5 which are arranged in order from an object side O to an image side I. The first, third, and fourth lens groups G1, G3, and G4 have positive refractive powers, and the second and fifth lens groups G2 and G5 have negative refractive powers. In the macro-lens system 111, the first and third lens groups G1 and G3 are fixed during focusing, but the second and fourth lens groups G2 and G4 are moved so as not to change an overall length during focusing. The fifth lens group G5 is moved or is fixed during focusing.

The second or third lens group G2 or G3 may perform an anti-handshake to compensates for image blur. For example, some lenses of the second or third lens group G2 or G3 may compensate for image blur.

Since the first lens group G1 has a positive refractive power, a ray converges on the second lens group G2. Thus, when some lenses of the second lens group G2 are used as an anti-hand shaking group due to a small aperture of the second lens group G2, a weight of the second lens group G2 may be made light. For example, FIG. 6 illustrates a process of compensating for image blur using some lenses of the second lens group G2.

If the third lens group G3 that is fixed during focusing is used as the anti-hand shaking group, it may be easy to design and electronically control a device for moving the anti-hand shaming group. For example, the third lens group G3 may include two lenses, one of which may be moved to compensate for image blur. For example, each of FIGS. 10 and 12 respectively illustrates a process of compensating for image blur using some lenses of the third lens group G3.

If the third lens group G3 includes the anti-hand shaking group, and a focal length of the third lens group G3 is too short, a performance change of the third lens group G3 may become serious due to a vertical movement of the anti-hand shaking group. Therefore, the third lens group G3 may be constituted to satisfy Expression 2 below so that the performance changes thereof do not become serious due to the movement of the anti-hand shaking group:

$$0.5 \leq \frac{f_3}{f} \leq 1.6 \quad \text{Expression (2)}$$

wherein $f_3$ denotes the focal length of the third lens group G3, and f denotes a total focal length of the macro-lens system 111. Therefore, the macro-lens system 111 according to the current embodiment may satisfy Expression 2 to reduce a performance change thereof caused by the movement of the anti-hand shaking group and increase a marginal ray ratio.

The macro-lens system 111 according to the invention may satisfy Expression 3 below:

$$60 \leq v_d \quad \text{Expression (3)}$$

wherein $v_d$ denotes an Abbe number of a lens of the third lens group G3 that is used as the anti-hand shaking group. If one lens of the third lens group G3 is used as the anti-hand shaking group, the macro-lens system 111 may satisfy Expression 3 to reduce changes in chromatic aberration caused by the movement of the anti-hand shaking group.

An aspheric shape used in the macro-lens system 111 according to the current embodiment will be defined as follows.

When a direction of an optical axis is an x-axis, and a vertical direction to the optical axis is a y-axis, a proceeding direction of a ray may be defined as a positive direction to define an aspheric shape as Expression 4 below:

$$x = \frac{cy^2}{1 + \sqrt{1 - (K+1)c^2y^2}} + Ay^4 + By^6 + Cy^8 + Dy^{10} \quad \text{Expression (4)}$$

wherein x denotes a length from a vertex of a lens to the direction of the optical axis, y denotes a length from the vertex of the lens to the vertical direction to the optical axis, K denotes a conic constant, A, B, C, and D denote aspheric coefficients, and c denotes a reverse number of a curvature radius at the vertex of the lens.

A macro-lens system is realized according to embodiments of the invention complying with various designs as will be described below. Hereinafter, f denotes a total focal length (mm), F-number denotes F number, and 2ω denotes a viewing angle (degree), and a filter may be installed at a position closest to the image side I in the drawings illustrating the embodiments of the invention.

FIG. 1 illustrates the macro-lens system 111 when the magnification is M=0.0, M=−0.5, and M=−1.0, according to an embodiment of the invention. The unit of curvature radius and thickness or distance is mm.

TABLE 1 f = 58.7 mm, F-number = 2.46, 2ω = 27.8°

| Lens Surface | Curvature Radius | Thickness or Distance | Refractive Index ($n_d$) | Abbe Number ($v_d$) |
|---|---|---|---|---|
| OBJECT | ∞ | A | | |
| S1 | 86.54 | 1.1 | 1.84666 | 23.8 |
| S2 | 27.448 | 7 | 1.61800 | 63.4 |
| S3 | −80.567 | 0.1 | | |
| S4 | 30.472 | 3.88 | 1.88300 | 40.8 |
| S5 | 84.25 | B | | |
| S6 | ∞ | 1 | 1.67270 | 32.2 |
| S7 | 23.281 | 3.191 | | |
| S8 | −98.577 | 1 | 1.71300 | 53.9 |
| S9 | 18.42 | 3.5 | 1.84666 | 23.8 |
| S10 | 45.542 | C | | |
| S11 | 40.097 | 3.03 | 1.84666 | 23.8 |
| S12 | −506.86 | 2.5 | | |
| STOP | ∞ | D | | |
| S14 | −35.5 | 1 | 1.84666 | 23.8 |
| S15 | 42.123 | 5.49 | 1.49700 | 81.6 |
| S16 | −30.96 | 0.1 | | |
| S17 | 109.136 | 3.73 | 1.88300 | 40.8 |
| S18 | −57.241 | 0.1 | | |
| S19 | 47.933 | 3.33 | 1.88300 | 40.8 |
| S20 | 352.589 | E | | |
| S21 | −102.127 | 1.1 | 1.62004 | 36.3 |
| S22 | 40.255 | F | | |
| S23 | ∞ | 3.7 | 1.51680 | 64.2 |
| S24 | ∞ | G | | |
| IMAGE | ∞ | | | |

Table 2 shows a variable distance of the macro-lens system 111 of FIG. 1 during focusing.

TABLE 2

| Length | M = 0.0 | M = −0.5 | M = 1.0 |
|---|---|---|---|
| A | ∞ | 117.0984 | 75.8 |
| B | 1.8922 | 7.3870 | 14.5347 |
| C | 13.4085 | 7.9137 | 0.7659 |
| D | 16.3183 | 9.3162 | 3.0000 |
| E | 2.2302 | 9.2323 | 15.5485 |
| F | 34.9999 | 34.9999 | 34.9999 |

Figure 2C:
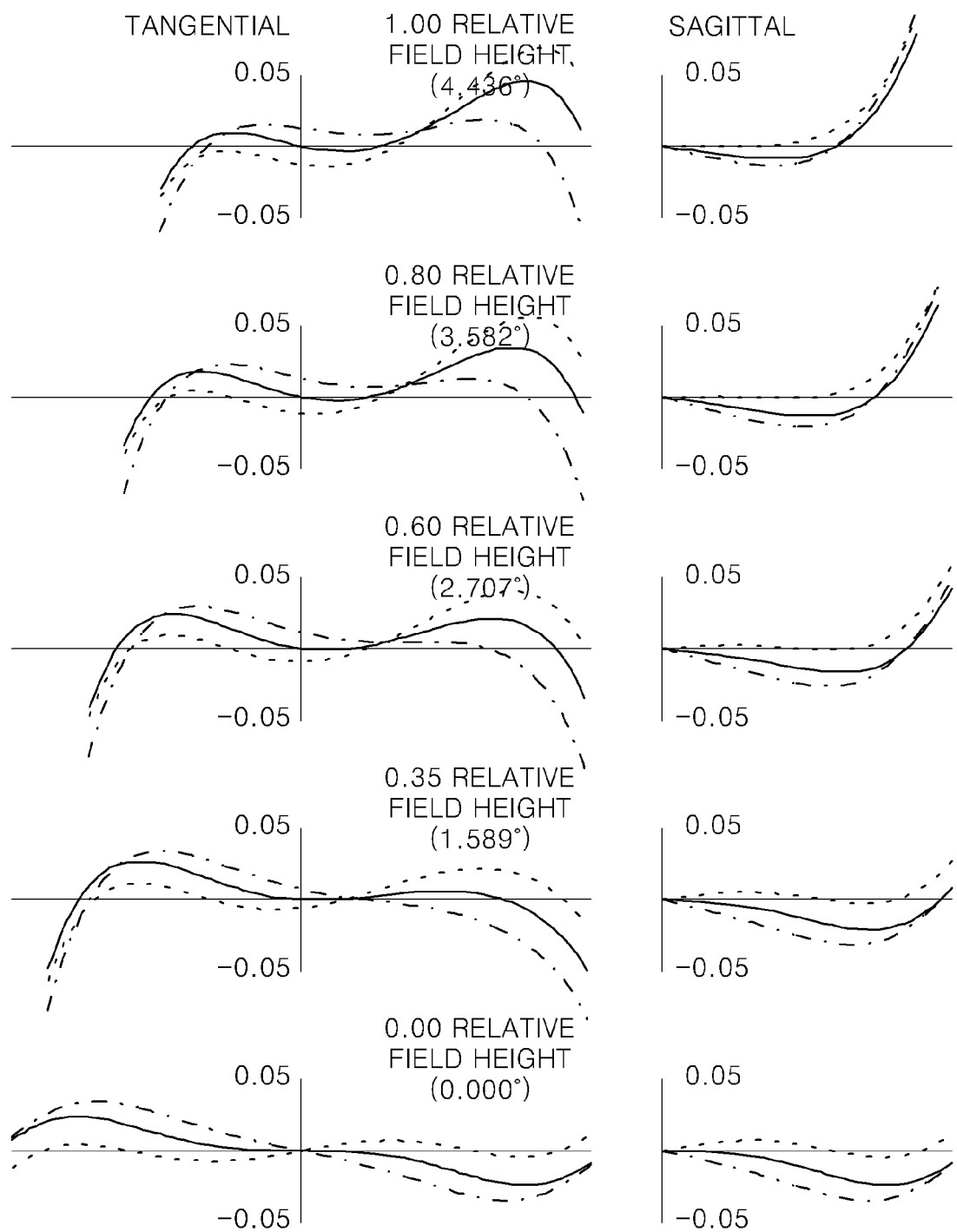
FIG. 2C illustrates the ray fan of the macro-lens system of FIG. 1 when the magnification is M=−1.0.

FIG. 2A illustrates a ray fan of the macro-lens system 111 of FIG. 1 when the magnification is M=0.0. FIG. 2B illustrates the ray fan of the macro-lens system 111 of FIG. 1 when the magnification is M=−0.5. FIG. 2C illustrates the ray fan of the macro-lens system 111 of FIG. 1 when the magnification is M=−1.0.

Figure 3A:
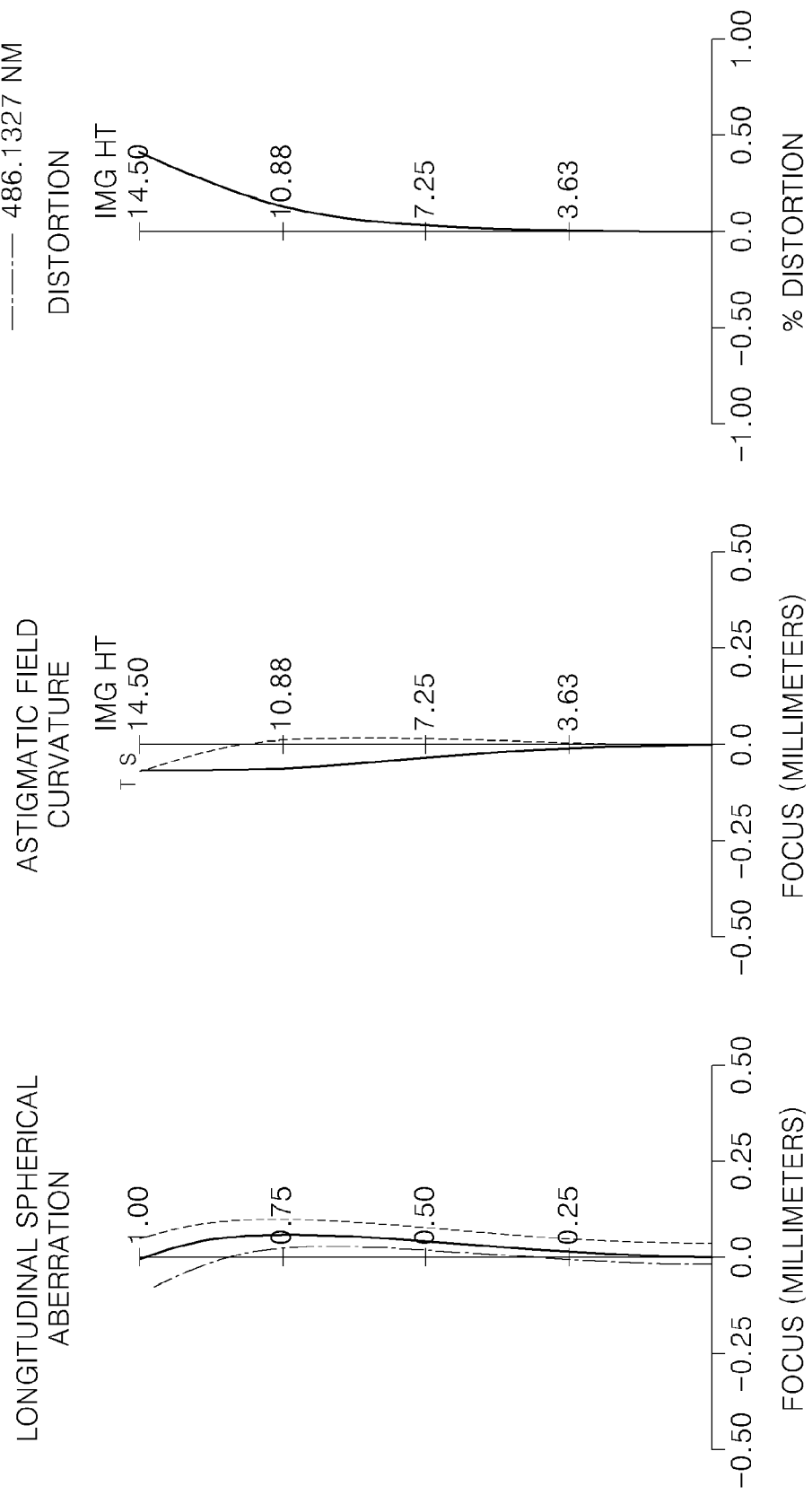
FIG. 3A illustrates a longitudinal spherical aberration, an astigmatic field curvature, and a distortion of the macro-lens system of FIG. 1 when the magnification is M=0.0.

FIG. 3A illustrates a longitudinal spherical aberration, an astigmatic field curvature, and a distortion of the macro-lens system 111 of FIG. 1 when the magnification is M=0.0. FIG. 3B illustrates a longitudinal spherical aberration, an astigmatic field curvature, and a distortion of the macro-lens system 111 of FIG. 1 when the magnification is M=−0.5. FIG. 3C illustrates a longitudinal spherical aberration, an astigmatic field curvature, and a distortion of the macro-lens system 111 of FIG. 1 when the magnification is M=−1.0. The longitudinal spherical aberration on C-line, D-line, and F-line is represented.

C-line is 656.3 nm, D-line is 587.6 nm, and F-line is 486.1 nm. A solid line at the astigmatic field curvature denotes an aberration on a sagittal image plane, and a dash line denotes an aberration on a tangential image plane.

Figure 4:
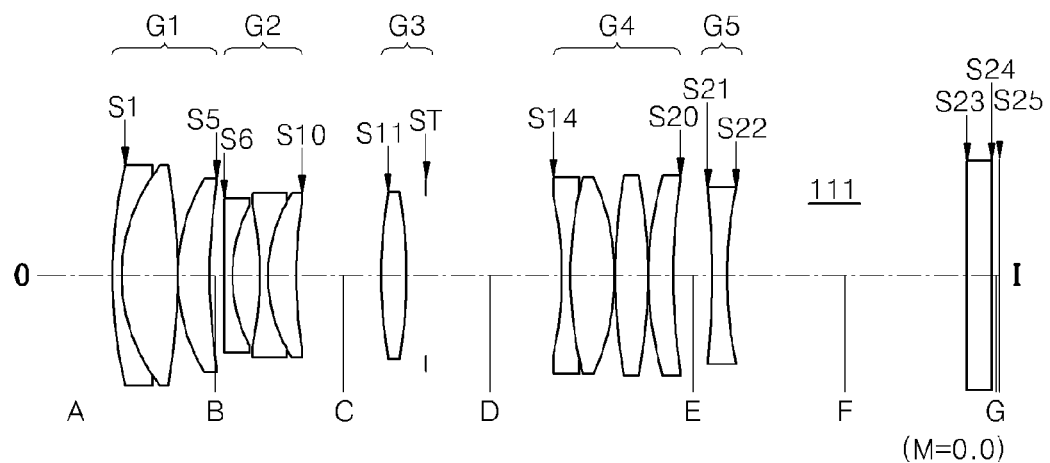
FIG. 4 illustrates a macro-lens system when a magnification is M=0, M=−0.5, and M=−1.0, according to another embodiment of the invention.
Figure 4:
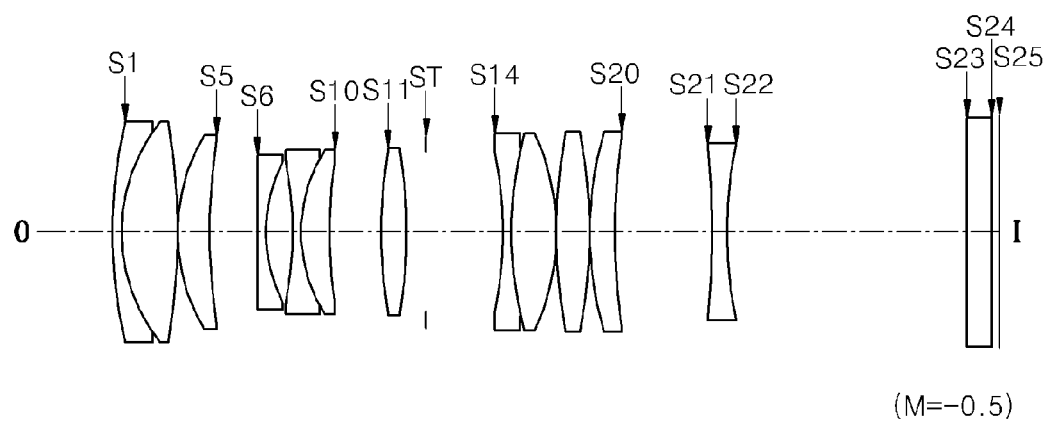
Figure 4:
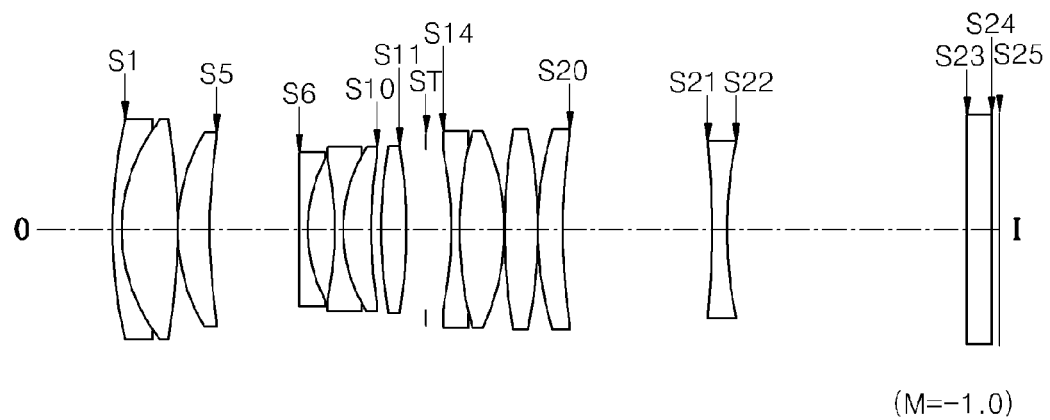

FIG. 4 illustrates a macro-lens system 111 when a magnification is M=0.0, M−0.5, and M=−1.0, according to another embodiment of the invention.

TABLE 3 f = 58.15 mm, F-number = 2.88, 2ω = 27.6°

| Lens Surface | Curvature Radius | Thickness or Distance | Refractive Index ($n_d$) | Abbe Number ($v_d$) |
|---|---|---|---|---|
| OBJECT | ∞ | A | | |
| S1 | 63.280 | 1.1 | 1.84666 | 23.8 |
| S2 | 22.329 | 6.78 | 1.62041 | 60.3 |
| S3 | −81.506 | 0.1 | | |
| S4 | 24.214 | 3.88 | 1.77250 | 49.6 |
| S5 | 75.611 | B | | |
| S6 | ∞ | 1 | 1.80610 | 33.3 |
| S7 | 18.796 | 3.326 | | |
| S8 | −46.289 | 1 | 1.62041 | 60.3 |
| S9 | 19.287 | 3.5 | 1.84666 | 23.8 |
| S10 | 62.670 | C | | |
| S11 | 67.109 | 3.03 | 1.84666 | 23.8 |
| S12 | −67.109 | 2.5 | | |
| STOP | ∞ | D | | |
| S14 | −46.919 | 1 | 1.84666 | 23.8 |
| S15 | 48.961 | 5.41 | 1.80420 | 46.5 |
| S16 | −30.432 | 0.1 | | |
| S17 | 70.554 | 4 | 1.83481 | 42.7 |
| S18 | −70.554 | 0.1 | | |
| S19 | 45.248 | 3 | 1.83400 | 37.3 |
| S20 | 81.462 | E | | |
| S21 | −104.623 | 1.8 | 1.80518 | 25.5 |
| S22 | 52.781 | F | | |
| S23 | ∞ | 3.0 | 1.51680 | 64.2 |
| S24 | ∞ | G | | |
| IMAGE | ∞ | | | |

Table 4 shows a variable length of the macro-lens system 111 of FIG. 4 during focusing.

TABLE 4

| Length | M = 0.0 | M = −0.5 | M = −1.0 |
|---|---|---|---|
| A | ∞ | 119.3370 | 75.8 |
| B | 1.7522 | 5.7979 | 10.9850 |
| C | 10.4342 | 6.3884 | 1.2014 |
| D | 16.5399 | 9.2964 | 3.0007 |
| E | 4.7566 | 12.0001 | 18.2958 |
| F | 29.3912 | 29.3912 | 29.3912 |
| G | 1.0000 | 1.0000 | 1.0000 |

Figure 5A:
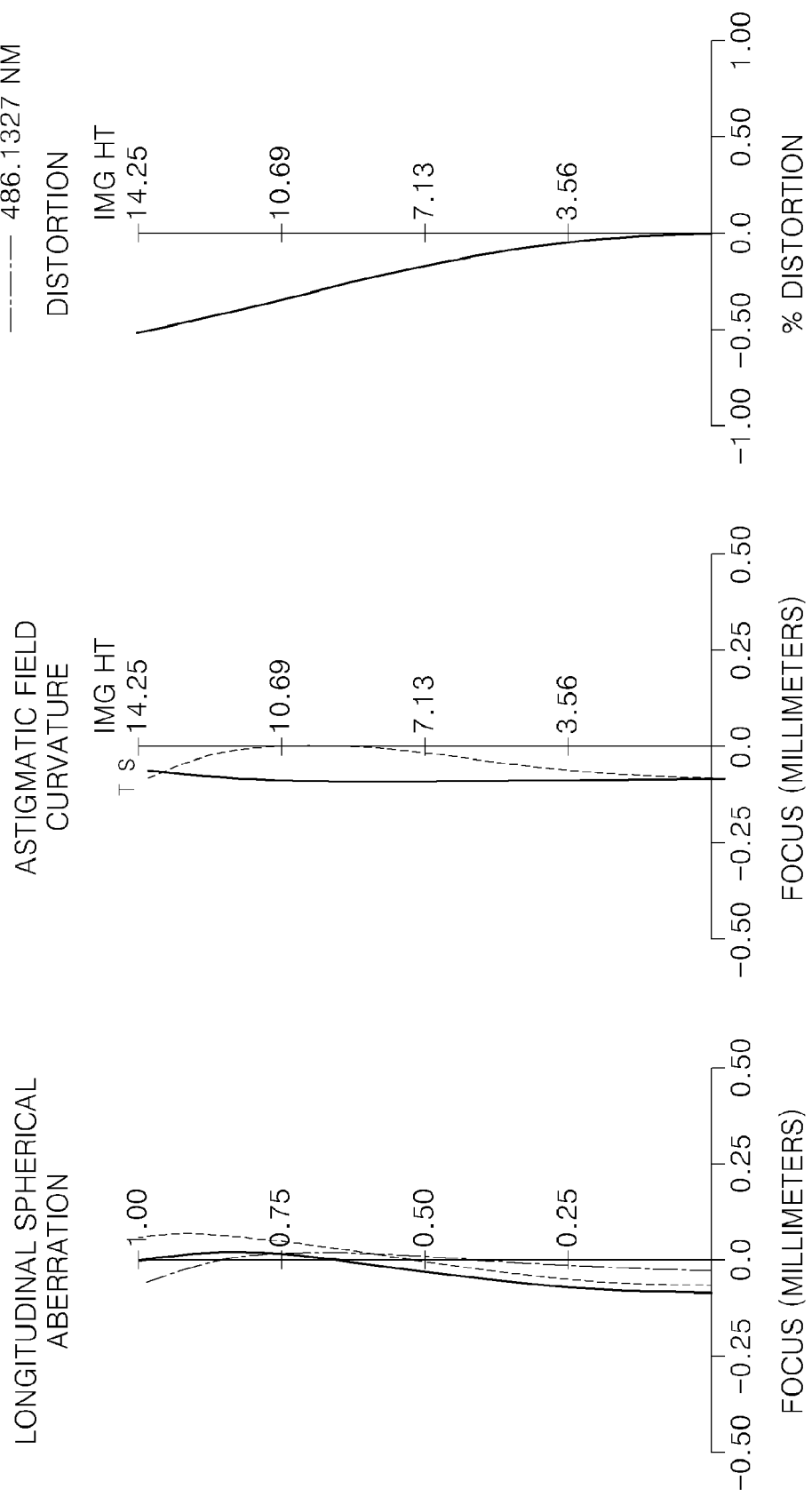
FIG. 5A illustrates a longitudinal spherical aberration, an astigmatic field curvature, and a distortion of the macro-lens system of FIG. 4 when the magnification is M=0.0.
Figure 5B:
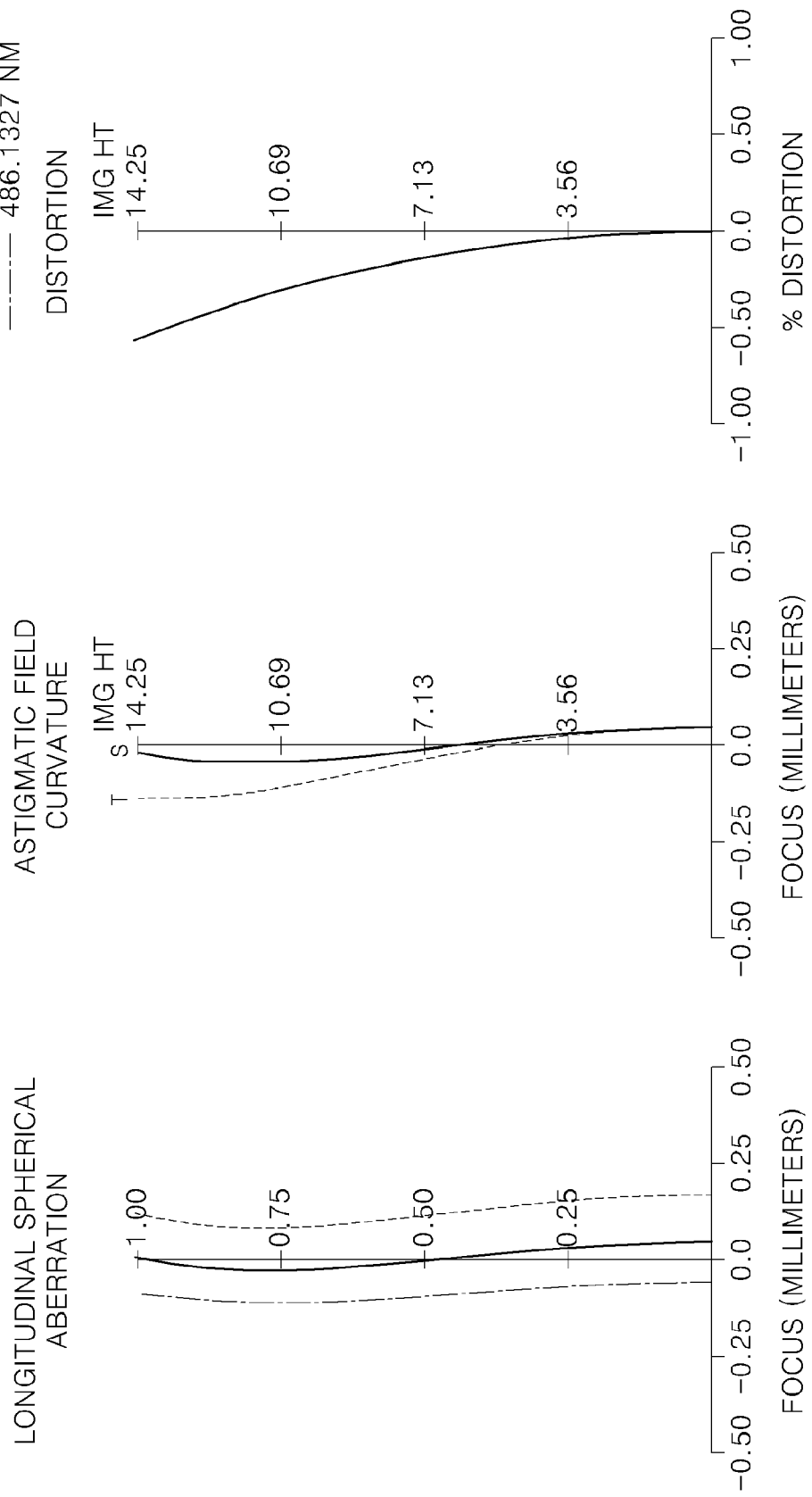
FIG. 5B illustrates a longitudinal spherical aberration, an astigmatic field curvature, and a distortion of the macro-lens system of FIG. 4 when the magnification is M=−0.5.
Figure 5C:
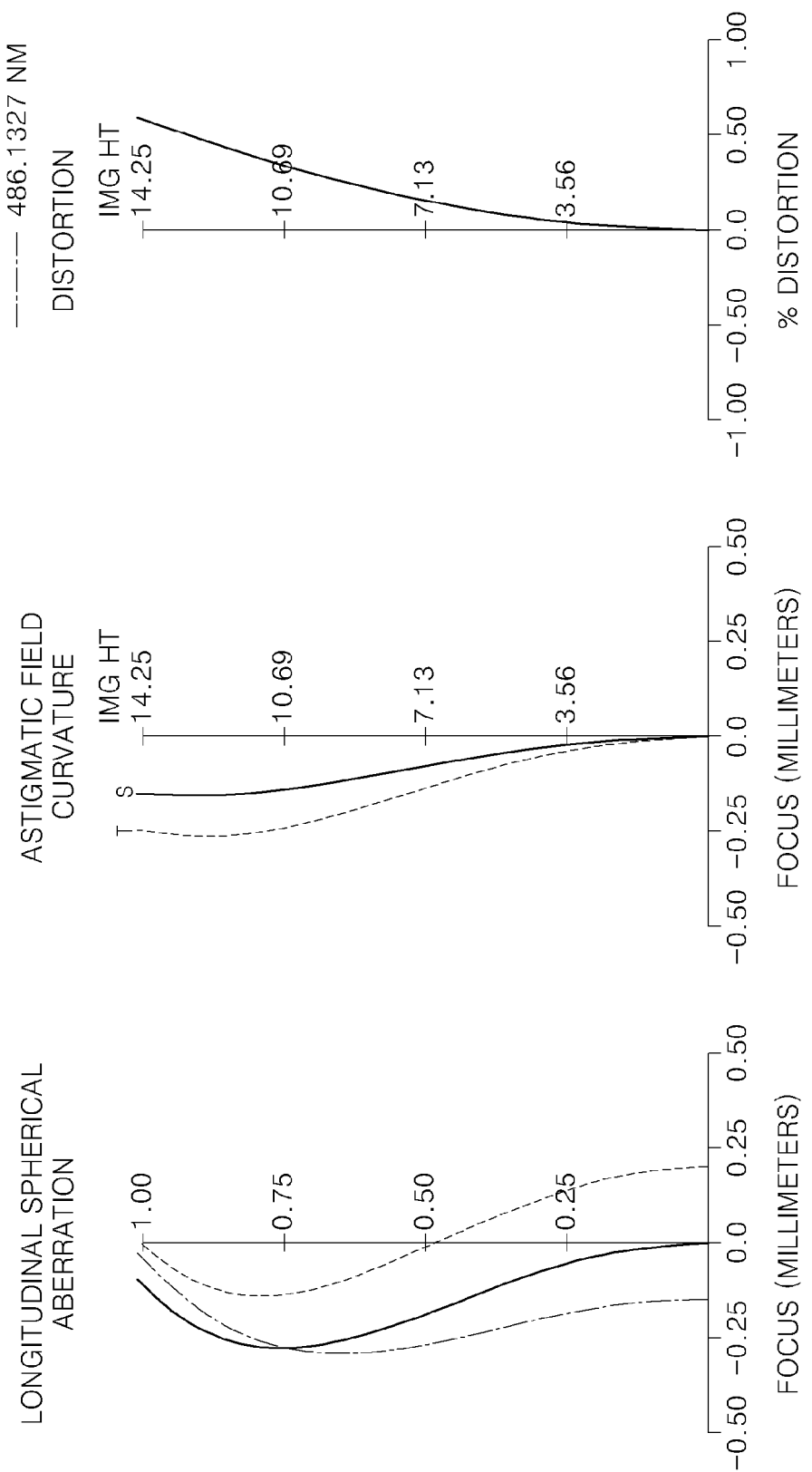
FIG. 5C illustrates a longitudinal spherical aberration, an astigmatic field curvature, and a distortion of the macro-lens system of FIG. 4 when the magnification is M=−1.0.

FIGS. 5A, 5B, and 5C respectively illustrate a longitudinal spherical aberration, an astigmatic field curvature, and a distortion of the macro-lens system 111 of FIG. 4 when the magnification is M=0.0, M=−0.5, and M=−1.0.

FIG. 6 illustrates the macro-lens system 111 when the magnification M=0.0, M=−0.5, and M=−1.0, according to another embodiment of the invention.

TABLE 5 f = 60.4 mm, F-number = 2.88, 2ω = 26.4°

| Lens Surface | Curvature Radius | Thickness or Distance | Refractive Index ($n_d$) | Abbe Number ($v_d$) |
|---|---|---|---|---|
| OBJECT | ∞ | A | | |
| S1 | 53.955 | 1.1 | 1.84666 | 23.8 |
| S2 | 23.365 | 6 | 1.61800 | 63.4 |
| S3 | −93.496 | 0.1 | | |
| S4 | 26.763 | 3.85 | 1.77250 | 49.6 |
| S5 | 74.029 | B | | |
| S6 | 324.5 | 1 | 1.80610 | 40.7 |
| S7 | 22.239 | 4.38 | | |
| S8 | −47.801 | 1 | 1.56883 | 56.0 |
| S9 | 20.36 | 3 | 1.84666 | 23.8 |
| S10 | 36.255 | C | | |
| S11 | 45.814 | 3.03 | 1.84666 | 23.8 |
| S12 | −91.527 | 1.5 | | |

TABLE 5-continued f = 60.4 mm, F-number = 2.88, 2ω = 26.4°

| Lens Surface | Curvature Radius | Thickness or Distance | Refractive Index ($n_d$) | Abbe Number ($v_d$) |
|---|---|---|---|---|
| STOP | ∞ | D | | |
| S14 | −39.318 | 1 | 1.84666 | 23.8 |
| S15 | 37.706 | 5.4 | 1.49700 | 81.6 |
| S16 | −31.77 | 0.1 | | |
| S17 | 73.471 | 4 | 1.83481 | 42.7 |
| S18 | −73.471 | 0.1 | | |
| S19 | 46.336 | 3 | 1.80610 | 33.3 |
| S20 | 8 | E | | |
| S21 | −93.964 | 1.5 | 1.75520 | 27.5 |
| S22 | 39.471 | F | | |
| S23 | ∞ | 2.8 | 1.51680 | 64.2 |
| S24 | ∞ | G | | |
| IMAGE | ∞ | | | |

Table 6 shows a variable distance of the macro-lens system 111 of FIG. 6 during focusing.

TABLE 6

| Length | M = 0.0 | M = −0.5 | M = −1.0 |
|---|---|---|---|
| A | ∞ | 119.2349 | 75.8000 |
| B | 2 | 6.6279 | 12.7884 |
| C | 12.1334 | 7.5055 | 1.3450 |
| D | 15.1136 | 8.5726 | 3.0429 |
| E | 2.5968 | 9.1379 | 14.6675 |
| F | 30.2962 | 30.2962 | 30.2962 |
| G | 1.0000 | 1.0000 | 1.0000 |

Figure 7A:
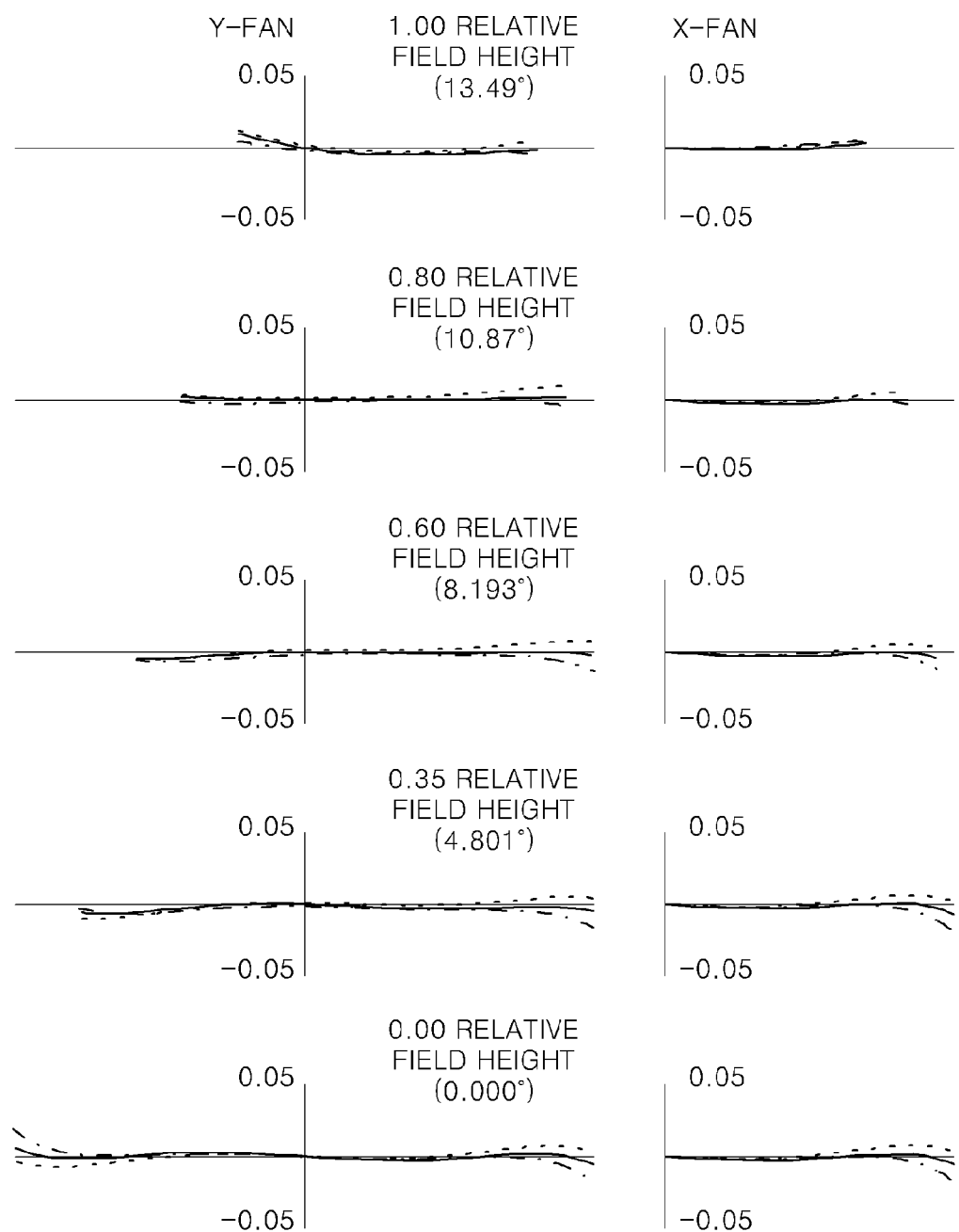
FIGS. 7A through 7C respectively illustrate ray fans of the macro-lens system of FIG. 6 when the magnification is M=0.0, M=−0.5, and M=−1.0.
Figure 7B:
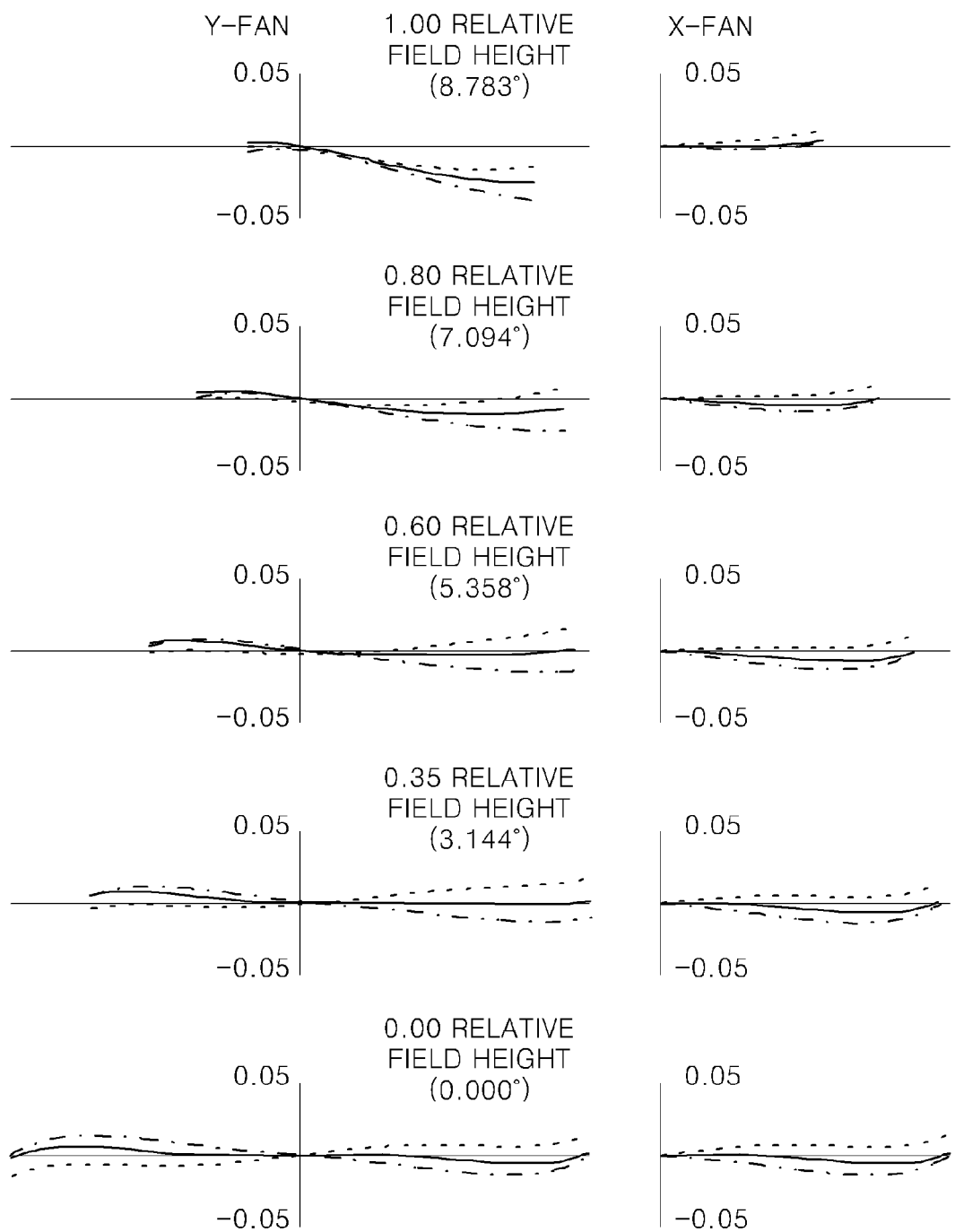
Figure 7C:
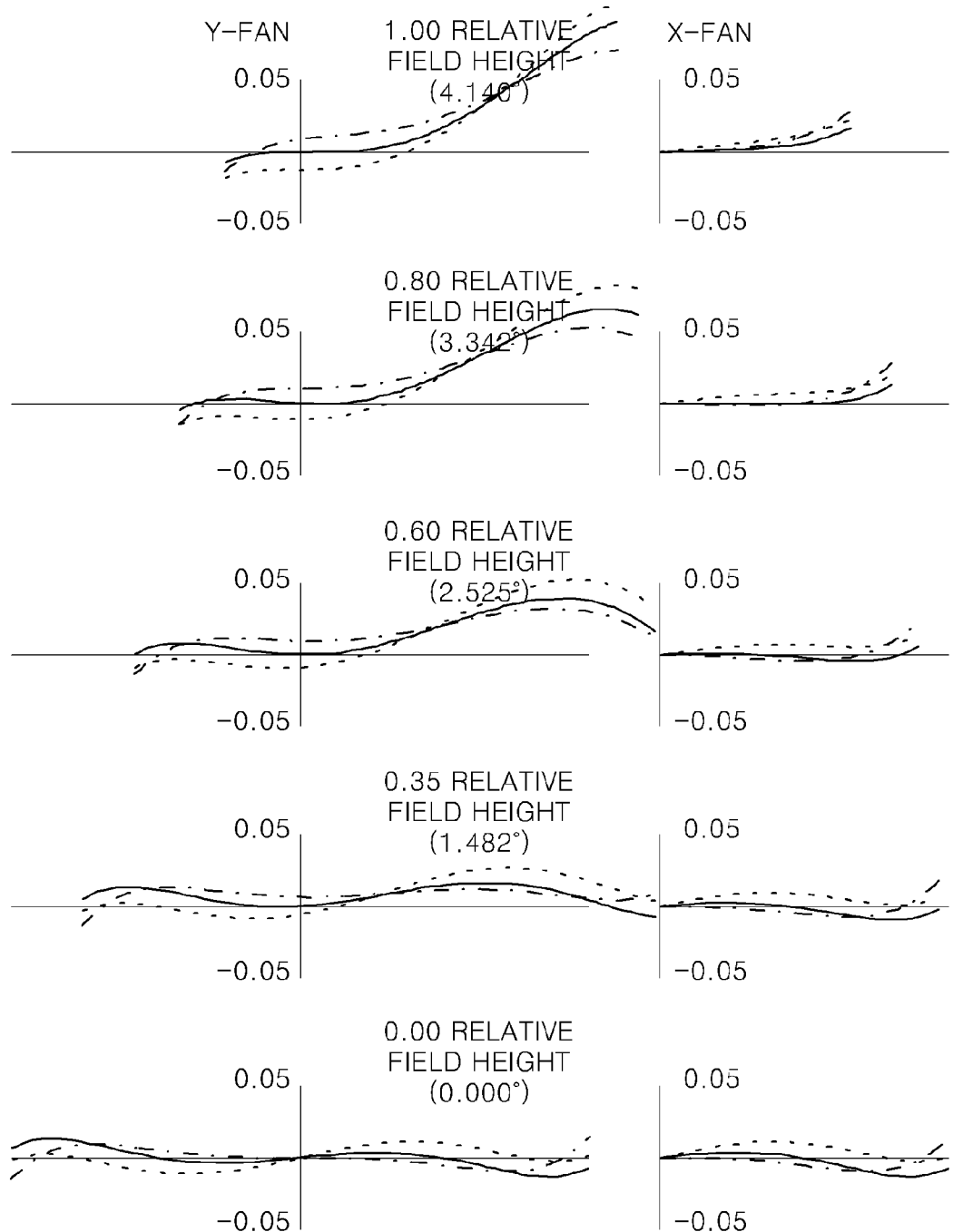

FIGS. 7A through 7C respectively illustrate a ray fan of the macro-lens system 111 of FIG. 6 when the anti-hand shaking group is not moved, and the magnification is M=0.0, M=−0.5, and M=−1.0.

Figure 8A:
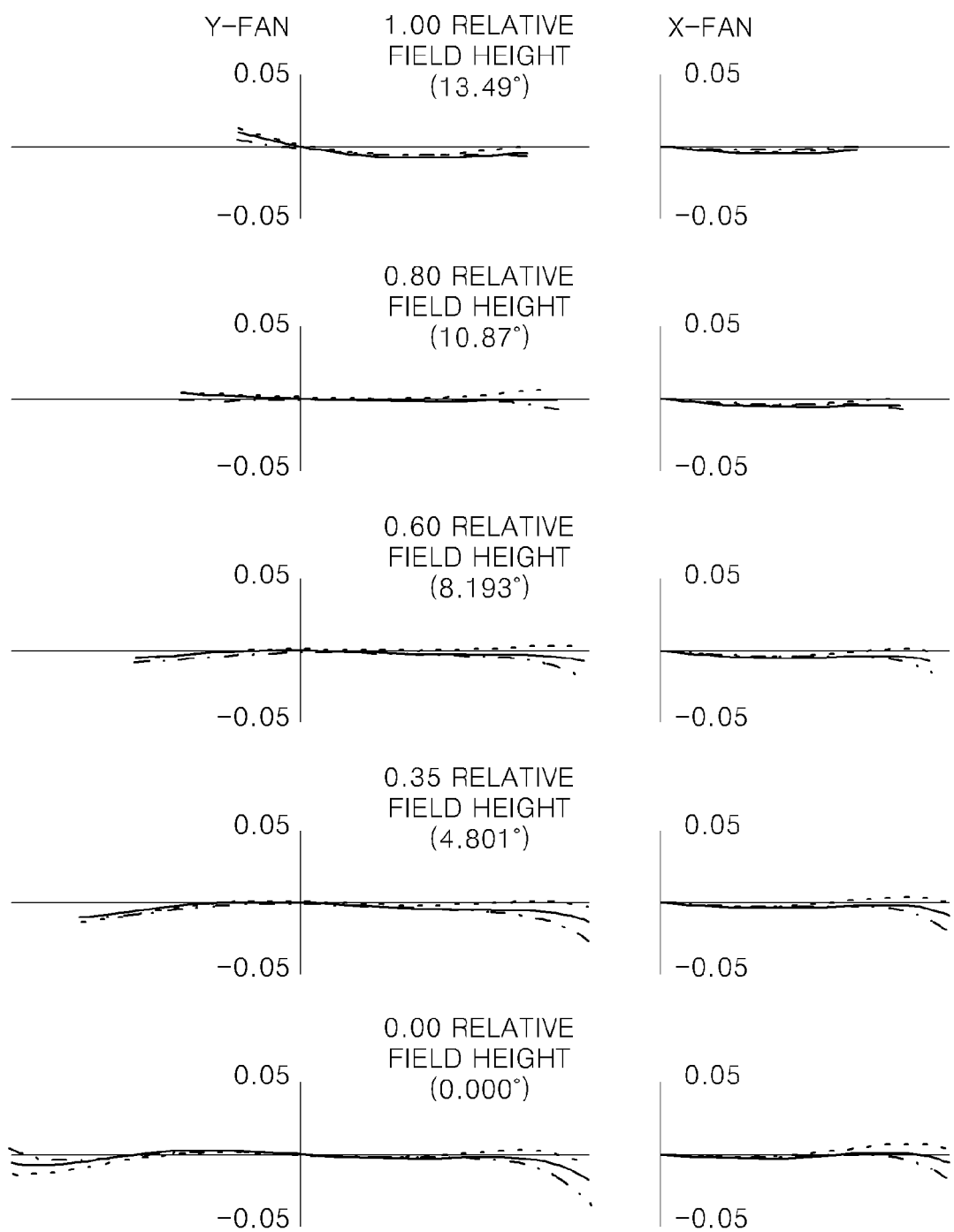

FIG. 8A illustrates the ray fan of the macro-lens system 111 of FIG. 6 when the magnification is M=0.0, and the anti-hand shaking group is moved by 0.32 mm downwards in a vertical direction to the optical axis.

Figure 8B:
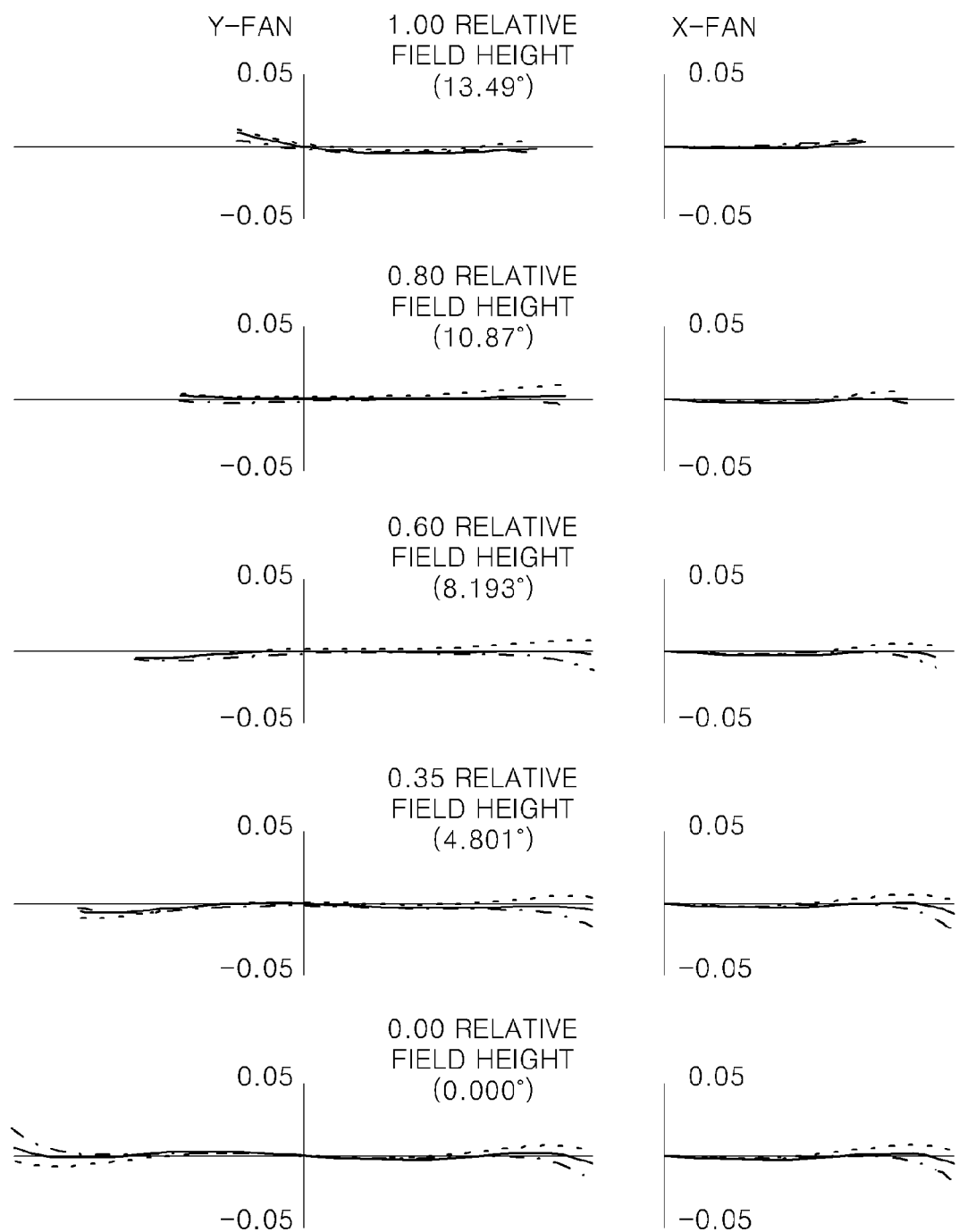

FIG. 8B illustrates the ray fan of the macro-lens system 111 of FIG. 6 when the magnification is M=0.0, and the anti-hand shaking group is not moved.

FIG. 8C illustrates the ray fan of the macro-lens system 111 of FIG. 6 when the magnification is M=0.0, and the anti-hand shaking group is moved by 0.32 mm upwards in the vertical direction to the optical axis.

Figure 9A:
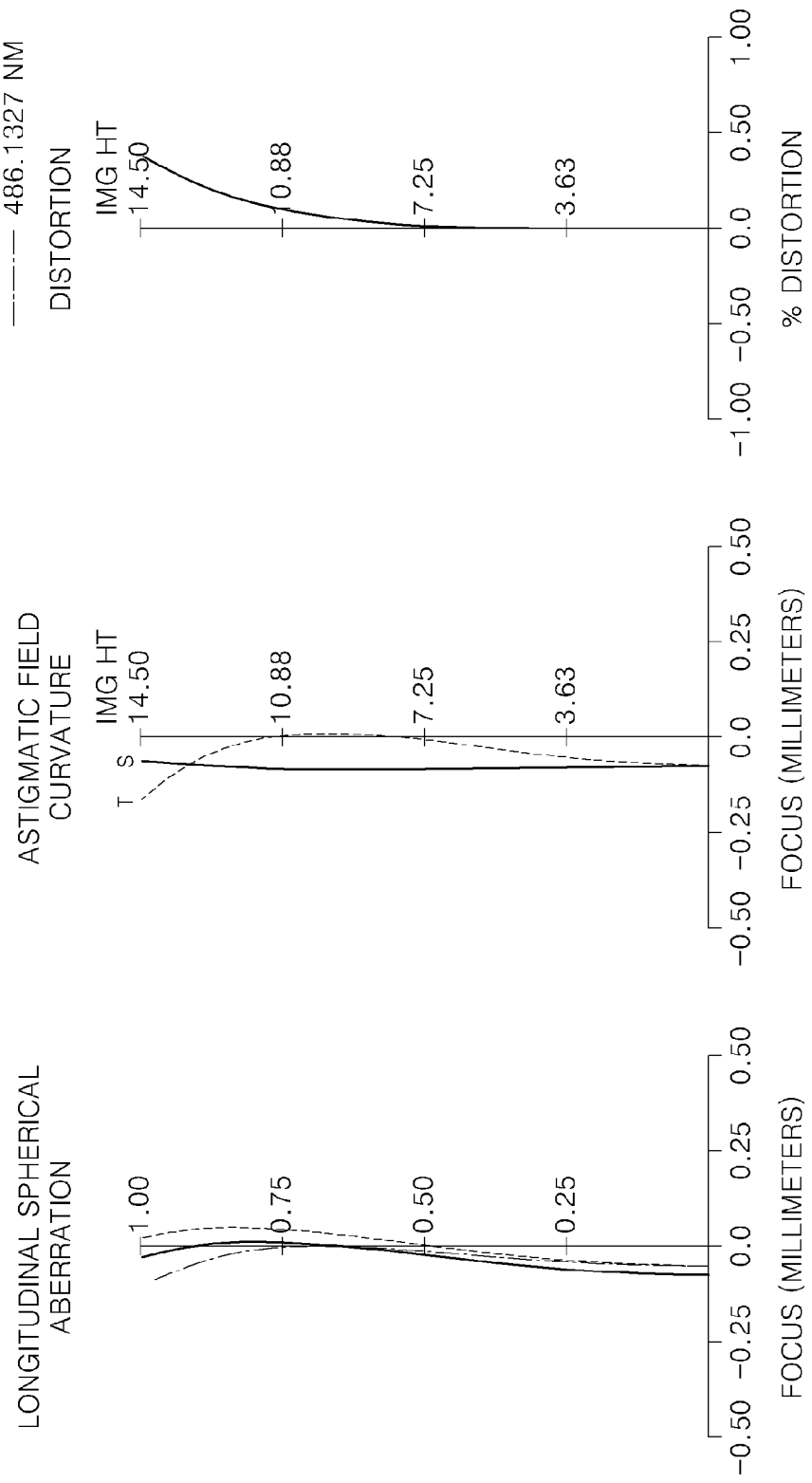
FIG. 9A illustrates a longitudinal spherical aberration, an astigmatic field curvature, and a distortion of the macro-lens system of FIG. 6 when the magnification is M=0.0.
Figure 9B:
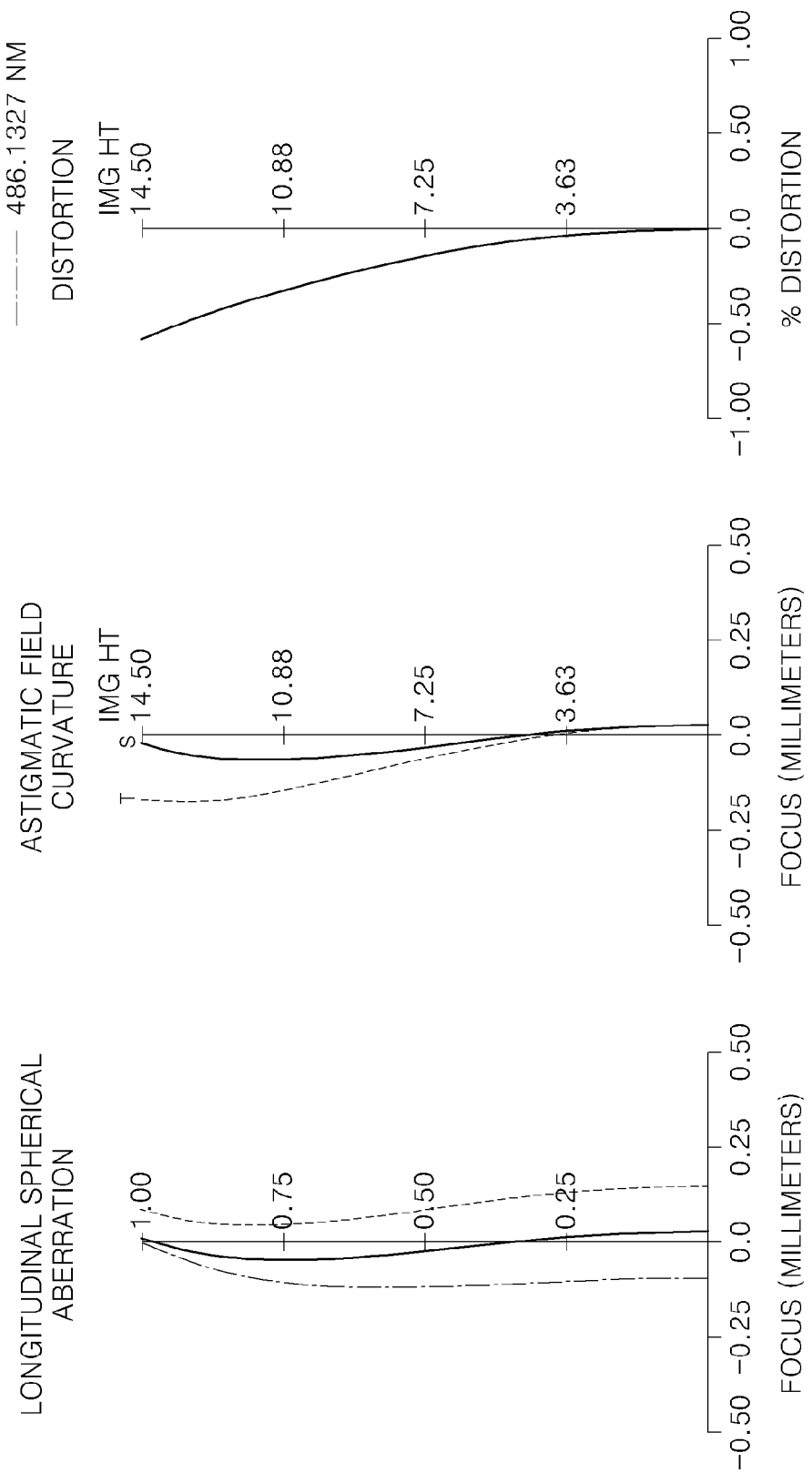
FIG. 9B illustrates a longitudinal spherical aberration, an astigmatic field curvature, and a distortion of the macro-lens system of FIG. 6 when the magnification is M=−0.5.

FIGS. 9A, 9B, and 9C respectively illustrates a longitudinal spherical aberration, an astigmatic field curvature, and a distortion of the macro-lens system 111 of FIG. 6 when the magnification is M=0.0, M=−0.5, and M=−1.0.

Figure 10:
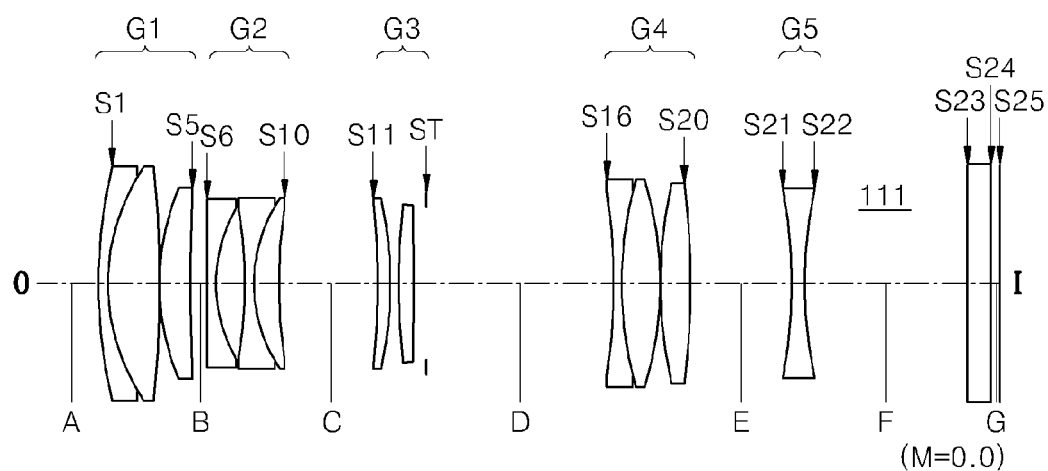
FIG. 10 illustrates a macro-lens system when a magnification is M=0, M=−0.5, and M=−1.0, according to another embodiment of the invention.
Figure 10:
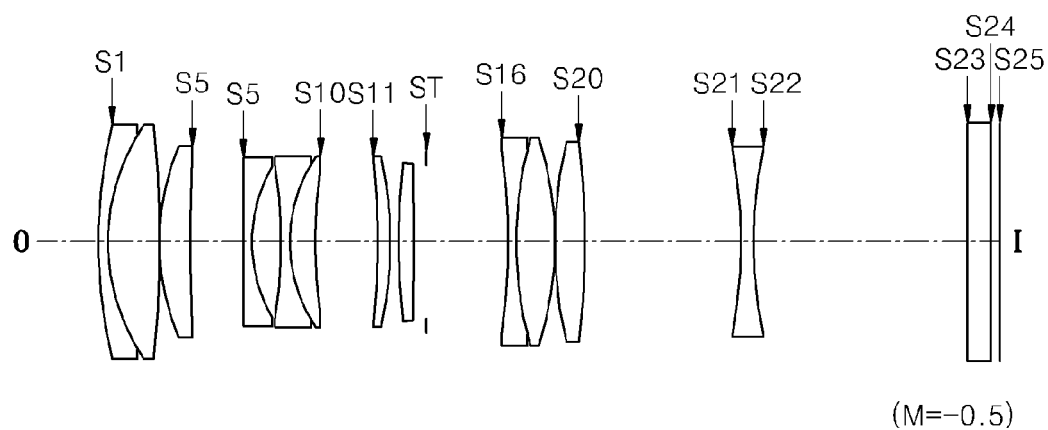
Figure 10:
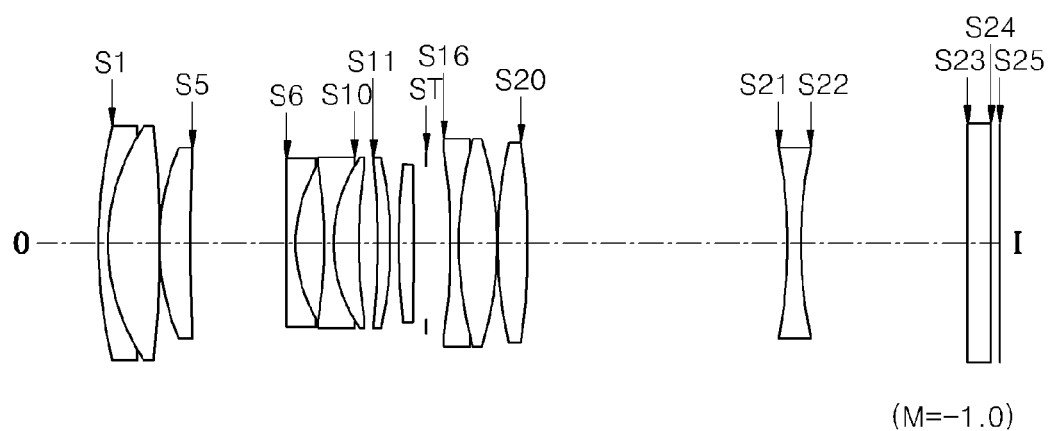

FIG. 10 illustrates a macro-lens system 111 when a magnification is M=0, M=−0.5, and M=−1.0, according to another embodiment of the invention.

TABLE 7 f = 59.3 mm, F-number = 2.88, 2ω = 27.2°

| Lens Surface | Curvature Radius | Thickness or Distance | Refractive Index ($n_d$) | Abbe Number ($v_d$) |
|---|---|---|---|---|
| OBJECT | ∞ | A | | |
| S1 | 61.226 | 1.1 | 1.84666 | 23.8 |
| S2 | 25.125 | 6 | 1.64000 | 60.2 |
| S3 | −159.983 | 0.1 | | |
| S4* | 29.597 | 3.6 | 1.74330 | 49.2 |
| S5 | 242.215 | B | | |
| S6 | ∞ | 1 | 1.62004 | 36.3 |

TABLE 7-continued f = 59.3 mm, F-number = 2.88, 2ω = 27.2°

| Lens Surface | Curvature Radius | Thickness or Distance | Refractive Index ($n_d$) | Abbe Number ($v_d$) |
|---|---|---|---|---|
| S7 | 18.576 | 3.403 | | |
| S8 | −56.35 | 1 | 1.63854 | 55.4 |
| S9 | 17.941 | 3 | 1.84666 | 23.8 |
| S10 | 63.799 | C | | |
| S11 | −100.582 | 1.46 | 1.84666 | 23.8 |
| S12 | −49.608 | 1 | | |
| S13 | 87.076 | 1.74 | 1.49700 | 81.6 |
| S14 | −349.059 | 1.5 | | |
| STOP | ∞ | D | | |
| S16 | −81.51 | 1 | 1.84666 | 23.8 |
| S17 | 47.2 | 4.5 | 1.69680 | 55.5 |
| S18 | −42.074 | 0.1 | | |
| S19 | 56.251 | 3.5 | 1.69680 | 55.5 |
| S20 | −94.909 | E | | |
| S21 | −59.701 | 1.5 | 1.48749 | 70.4 |
| S22 | 53.845 | F | | |
| S23 | ∞ | 2.8 | 1.51680 | 64.2 |
| S24 | ∞ | G | | |
| IMAGE | ∞ | | | |

Table 8 shows a variable distance of the macro-lens system 111 of FIG. 10 during focusing.

TABLE 8

| Length | M = 0.0 | M = −0.5 | M = 1.0 |
|---|---|---|---|
| A | ∞ | 129.2449 | 75.0000 |
| B | 2 | 6.2276 | 11.4583 |
| C | 11.6583 | 7.4307 | 2.2000 |
| D | 21.9827 | 9.5527 | 2.8500 |
| E | 11.8629 | 18.3513 | 30.6334 |
| F | 19.1931 | 25.1347 | 19.5552 |
| G | 1.0000 | 1.0000 | 1.0000 |

Table 9 shows an aspheric coefficient of the macro-lens system 111 of FIG. 10.

TABLE 9

| S4 | Aspheric Coefficient |
|---|---|
| K | 0 |
| A | −1.640967e−6 |
| B | −4.347895e−9 |
| C | 0 |
| D | 0 |

Figure 11B:
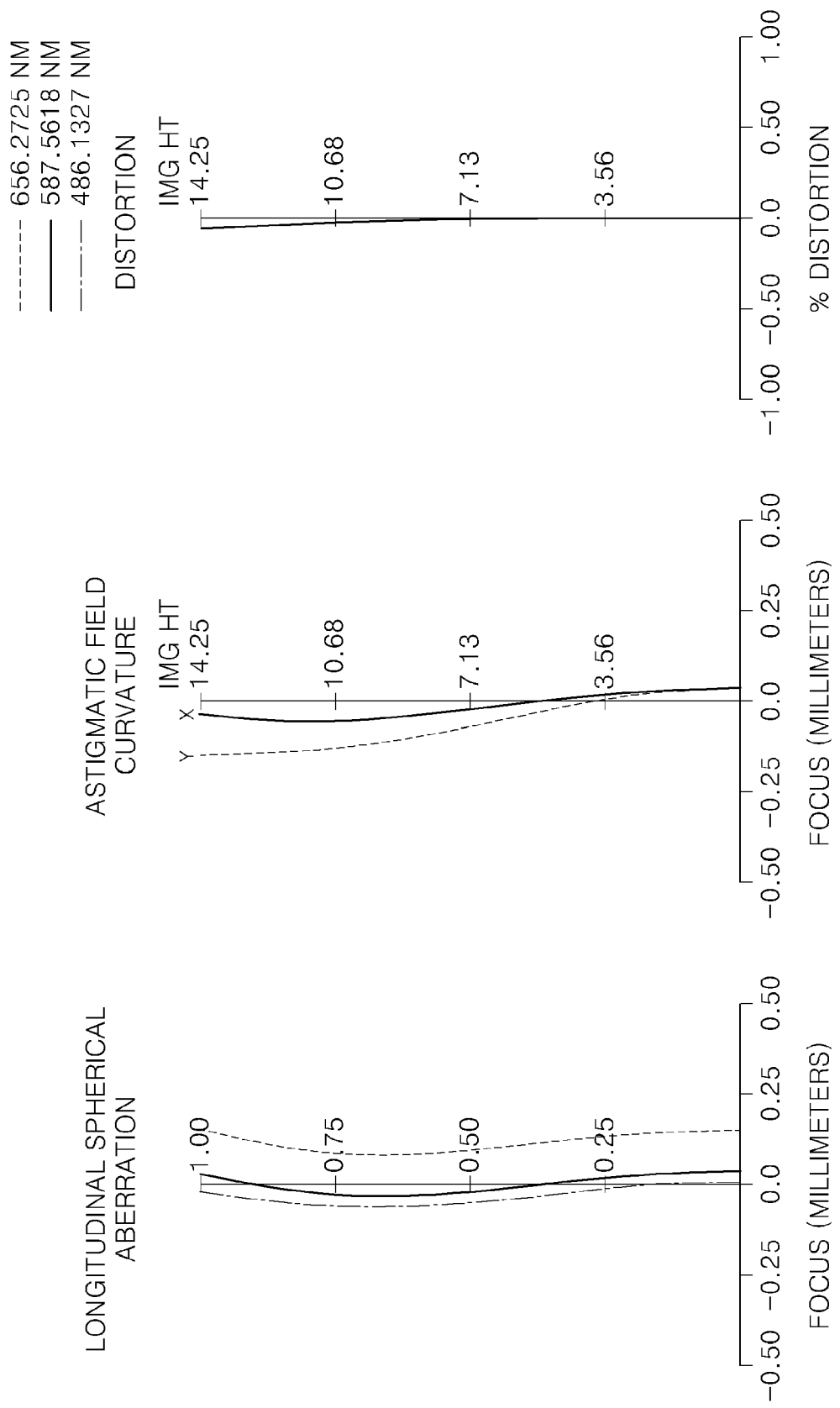
FIG. 11B illustrates a longitudinal spherical aberration, an astigmatic field curvature, and a distortion of the macro-lens system of FIG. 10 when the magnification is M=−0.5.

FIGS. 11A, 11B, and 11C respectively illustrates a longitudinal spherical aberration, an astigmatic field curvature, and a distortion of the macro-lens system 111 of FIG. 10 when the magnification is M=0.0, M=−0.5, and M=−1.0.

Figure 12:
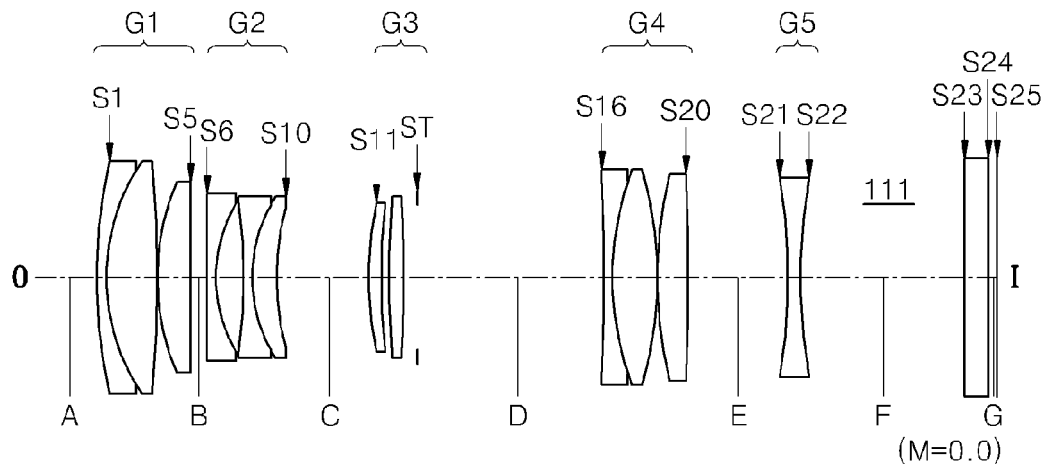
FIG. 12 illustrates a macro-lens system when a magnification is M=0, M=−0.5, and M=−1.0, according to another embodiment of the invention.
Figure 12:
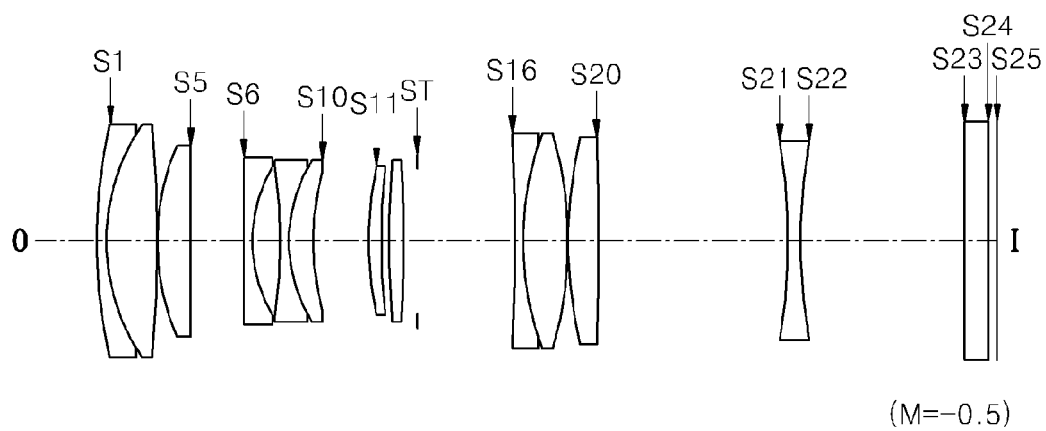
Figure 12:
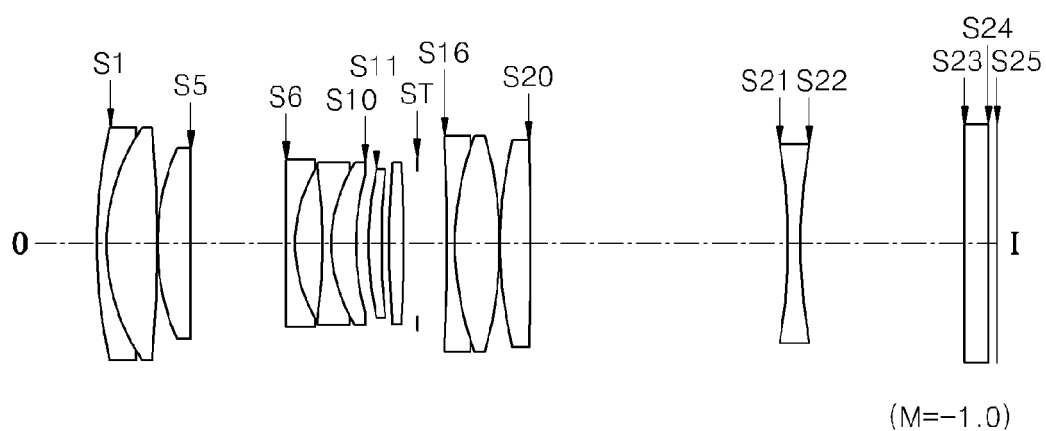

FIG. 12 illustrates a macro-lens system 111 when a magnification is M=0, M=−0.5, M=−1.0, according to another embodiment of the invention.

TABLE 10 f = 59.3 mm, F-number = 2.86, 2ω = 27.0°

| Lens Surface | Curvature Radius | Thickness or Distance | Refractive Index ($n_d$) | Abbe Number ($v_d$) |
|---|---|---|---|---|
| OBJECT | ∞ | A | | |
| S1 | 61.558 | 1.1 | 1.84666 | 23.8 |
| S2 | 24.298 | 6 | 1.61780 | 63.4 |
| S3 | −177.589 | 0.1 | | |
| S4* | 29.064 | 3.85 | 1.73968 | 49.0 |

TABLE 10-continued f = 59.3 mm, F-number = 2.86, 2ω = 27.0°

| Lens Surface | Curvature Radius | Thickness or Distance | Refractive Index ($n_d$) | Abbe Number ($v_d$) |
|---|---|---|---|---|
| S5 | 965.867 | B | | |
| S6 | ∞ | 1 | 1.56883 | 56.0 |
| S7 | 18.094 | 3.22 | | |
| S8 | −70.118 | 1 | 1.51680 | 64.2 |
| S9 | 17.623 | 2.9 | 1.84666 | 23.8 |
| S10 | 31.254 | C | | |
| S11 | 45.769 | 1.39 | 1.84666 | 23.8 |
| S12 | 68.03 | 0.98 | | |
| S13 | 134.285 | 1.78 | 1.49700 | 81.6 |
| S14 | −134.285 | 1.5 | | |
| ∞ | ∞ | D | | |
| S16 | −244.231 | 1 | 1.84666 | 23.8 |
| S17 | 37.427 | 5.22 | 1.69680 | 55.5 |
| S18 | −47.2 | 0.1 | | |
| S19 | 54.936 | 3.6 | 1.77250 | 49.6 |
| S20 | −295.683 | E | | |
| S21 | −72.217 | 1.5 | 1.48749 | 70.4 |
| S22 | 72.217 | F | | |
| S23 | ∞ | 2.8 | 1.51680 | 64.2 |
| S24 | ∞ | G | | |
| IMAGE | ∞ | | | |

Table 11 shows a variable distance of the macro-lens system 111 of FIG. 12 during focusing.

TABLE 11

| Length | M = 0.0 | M = −0.5 | M = 1.0 |
|---|---|---|---|
| A | ∞ | 124.9239 | 79.4080 |
| B | 2.0000 | 6.2983 | 11.3642 |
| C | 10.94 | 6.6417 | 1.5758 |
| D | 22.0052 | 11.5409 | 3.5925 |
| E | 11.7148 | 22.1791 | 30.1275 |
| F | 19.3000 | 19.3000 | 19.3000 |
| G | 1.0000 | 1.0000 | 1.0000 |

Table 12 shows an aspheric coefficient of the macro-lens system 111 of FIG. 12.

TABLE 12

| S4 | Aspheric Coefficient |
|---|---|
| K | 0 |
| A | −1.4452e−6 |
| B | −2.54447e−9 |
| C | 0 |
| D | 0 |

Figure 13A:
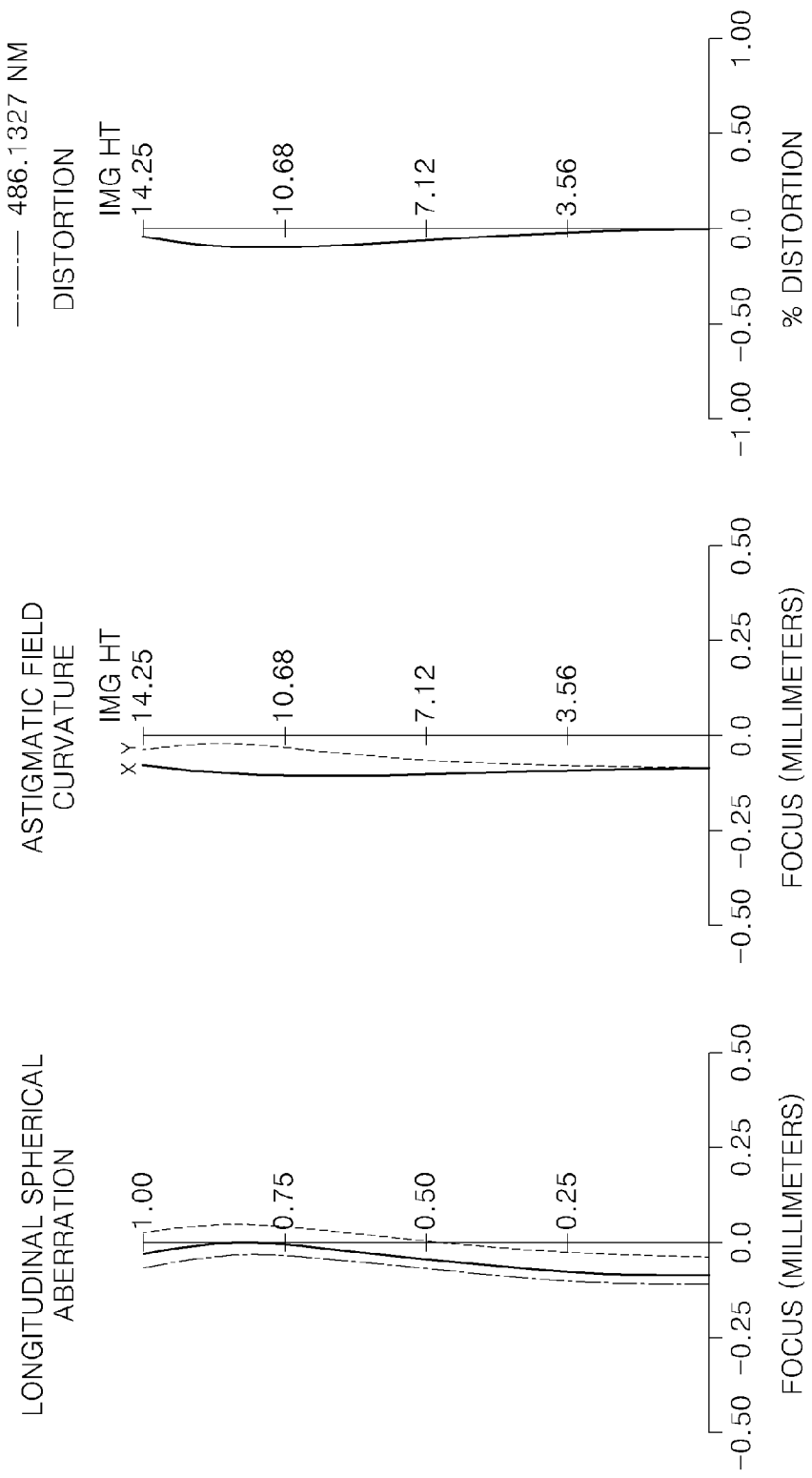
FIG. 13A illustrates a longitudinal spherical aberration, an astigmatic field curvature, and a distortion of the macro-lens system of FIG. 12 when the magnification is M=0.0.
Figure 13B:
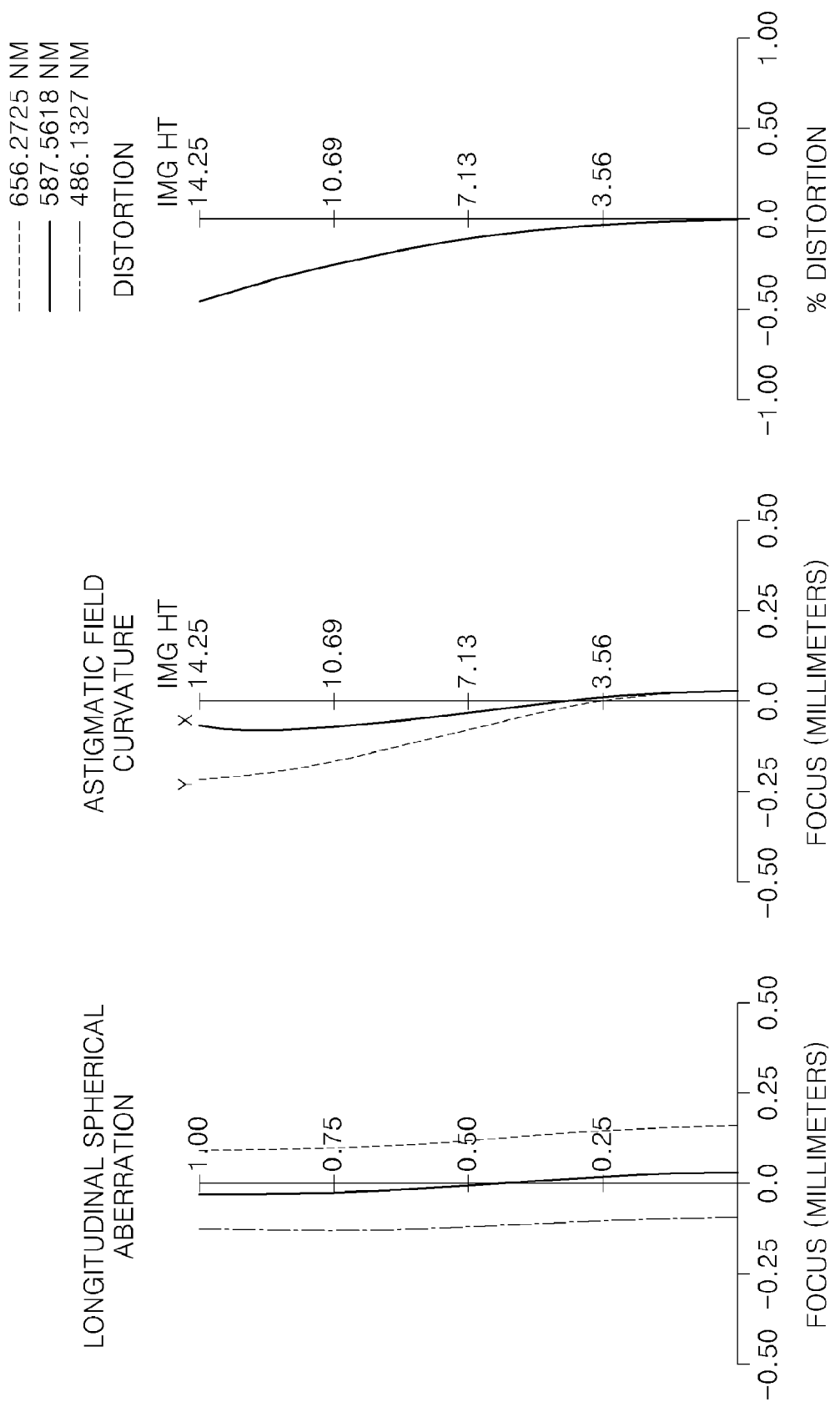
FIG. 13B illustrates a longitudinal spherical aberration, an astigmatic field curvature, and a distortion of the macro-lens system of FIG. 12 when the magnification is M=−0.5.

FIGS. 13A, 13B, and 13C respectively illustrate a longitudinal spherical aberration, an astigmatic field curvature, and a distortion of the macro-lens system 111 of FIG. 12 when the magnification is M=0.0, M=−0.5, and M=−1.0.

Table 13 shows that the embodiments of the invention respectively satisfy Expressions 1, 2, 3, and 4.

TABLE 13

| | First Embodiment | Second Embodiment | Third Embodiment | Fourth Embodiment | Fifth Embodiment |
|---|---|---|---|---|---|
| Expression 1 or 2 | 0.75 | 0.69 | 0.6 | 1.06 | 1.26 |
| Expression 3 | n/a | n/a | n/a | 81.6 | 81.6 |
| Expression 4 | 49.5 | 45.6 | 34.8 | 36.8 | 32.1 |

A marginal ray ratio of the macro-lens system 111 of FIG. 12 may be approximately calculated as Expression 5 below.

$$F = \frac{(m_2 - m_1)l_3}{2m_0^2} \quad \text{Expression (5)}$$

wherein $m_0$ denotes a direction cosine to an angle that an axial marginal ray forms with an optical axis, $m_1$ denotes a direction cosine with respect to a lower ray of a marginal ray focused on a tangential plane in a full-field, $m_2$ denotes a direction cosine with respect to an upper ray of the marginal ray focused on the tangential plane in the full-field, and $l_3$ denotes a direction cosine of a marginal ray focused on a saggital plane in the full-field. For example, when an image height is 14.25 mm on an imaging surface in the full-field, the marginal ray ratios of the macro-lens systems 111 according to the embodiments of the invention are respectively calculated as 49.5, 45.6, 34.8, 36.8, and 32.1. Therefore, the macro-lens systems 111 according to the embodiments of the invention may obtain great marginal ray ratios.

As described above, a macro-lens system according to the invention may be made compact and light and take close-up pictures. Also, the macro-lens system may take close-up pictures and character pictures or landscape pictures in the vicinity of an infinite object length.

Figure 14:
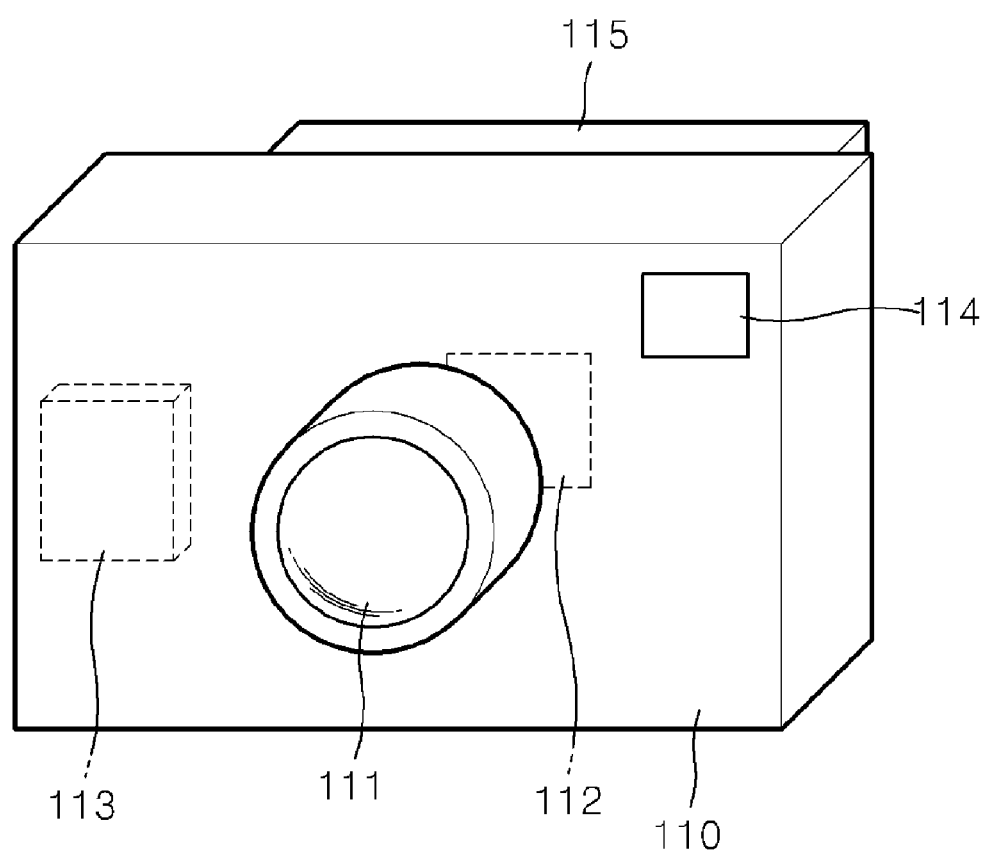
FIG. 14 schematically illustrates a photographing apparatus having a macro-lens system according to an embodiment of the invention.

FIG. 14 illustrates a photographing apparatus having the macro-lens system 111, according to an embodiment of the invention. Referring to FIG. 14, the photographing apparatus includes the macro-lens system 111 according to the above-described embodiments of the invention and an imaging device 112 which receives a ray imaged by the macro-lens system 111. The photographing apparatus further includes a recording means 113 which records information corresponding to a subject image that is photoelectrically transformed by the imaging device 112 and a viewfinder 114 through which the subject image is viewed. The photographing apparatus further includes a display unit 115 which displays the subject image. The viewfinder 114 and the display unit 115 are separately installed herein, but only the display unit 115 may be installed without the viewfinder 114. The photographing apparatus shown in FIG. 14 is only an example and is not limited thereto. Therefore, the photographing apparatus may be applied to cameras and various types of optical system.

As described above, a macro-lens system according to the invention may be applied to a photographing apparatus such as a digital camera or the like. Thus, an optical system which is compact, low-priced, and bright, e.g., is capable of photographing to one time, may be realized.

The invention provides a macro-lens system which does not change an optical overall length during focusing and is conveniently carried, and a photographing apparatus having the same.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:
1. A macro-lens system comprising:
a first lens group which has a positive refractive power and is fixed during focusing;
a second lens group which has a negative refractive power and is moved during focusing;
a third lens group which has a positive refractive power and is fixed during focusing;
a fourth lens group which has a positive refractive power and is moved during focusing; and
a fifth lens group which has a negative refractive power,
wherein the first, second, third, fourth, and fifth lens groups are arranged in order from an object side to an image side, and the macro-lens system satisfies the expression:

$$0.5 \leq \frac{f_3}{f} \leq 0.9$$

wherein $f_3$ denotes a focal length of the third lens group, and f denotes a total focal length of the macro-lens system.

2. The macro-lens system of claim 1, wherein some lenses of the second lens group are moved in a vertical direction to an optical axis to compensate for image blur.

3. The macro-lens system of claim 1, wherein the second lens group is moved from the object side to the image side during focusing.

4. The macro-lens system of claim 1, wherein the fourth lens group is moved from the image side to the object side during focusing.

5. The macro-lens system of claim 1, wherein the fifth lens group is fixed during focusing.

6. The macro-lens system of claim 1, wherein the fifth lens group comprises a lens.

7. The macro-lens system of claim 1, wherein the first lens group comprises at least one doublet lens.

8. The macro-lens system of claim 1, wherein the third lens group comprises a stop.

9. The macro-lens system of claim 1, wherein the second lens group comprises one of a meniscus lens, a biconcave lens, and a plano-concave lens.

10. The macro-lens system of claim 1, wherein a maximum magnification of the macro-lens system is within a range between about −0.5 and about −1.

11. A macro-lens system comprising:
a first lens group which has a positive refractive power and is fixed during focusing;
a second lens group which has a negative refractive power and is moved during focusing;
a third lens group which has a positive refractive power and is fixed during focusing;
a fourth lens group which has a positive refractive power and is moved during focusing; and
a fifth lens group which has a negative refractive power,
wherein the first, second, third, fourth, and fifth lens groups are arranged in order from an object side to an image side, and the third lens group comprises an anti-hand shaking group which is moved in a vertical direction to an optical axis to compensate for image blur.

12. The macro-lens system of claim 11, wherein some lenses of the third lens group compensate for image blur.

13. The macro-lens system of claim 11, wherein the macro-lens system satisfies the expression:

$$0.5 \leq \frac{f_3}{f} \leq 1.6$$

wherein $f_3$ denotes a focal length of the third lens group, and f denotes a total focal length of the macro-lens system.

14. The macro-lens system of claim 11, wherein the macro-lens system satisfies the expression:

$$60 \leq v_d$$

wherein $v_d$ denotes an Abbe number of a lens of the third lens group which is used as the anti-hand shaking group.

15. The macro-lens system of claim 11, wherein the second lens group is moved from the object side to the image side during focusing.

16. The macro-lens system of claim 11, wherein the fourth lens group is moved from the image side to the object side during focusing.

17. The macro-lens system of claim 11, wherein the fifth lens group is fixed during focusing.

18. The macro-lens system of claim 11, wherein the fifth lens group comprises a lens.

19. The macro-lens system of claim 11, wherein the first lens group comprises at least one doublet lens.

20. The macro-lens system of claim 11, wherein the third lens group comprises a stop.

21. The macro-lens system of claim 11, wherein the second lens group comprises one of a meniscus lens, a biconcave lens, and a plano-concave lens.

22. A photographing apparatus comprising:
a macro-lens system; and
an image device arranged to receive an image formed by the macro-lens system,
wherein the macro-lens system comprises first, second, third, fourth, and fifth lens groups which are arranged in order from an object side to an image side, wherein the first lens group has a positive refractive power and is fixed during focusing, the second lens group has a negative refractive power and is moved during focusing, the third lens group has a positive refractive power and is fixed during focusing, the fourth lens group has a positive refractive power and is moved during focusing, the fifth lens group has a negative refractive power, and the macro-lens system satisfies the expression:

$$0.5 \leq \frac{f_3}{f} \leq 0.9$$

wherein $f_3$ denotes a focal length of the third lens group, and f denotes a total focal length of the macro-lens system.

* * * * *